US007046842B2

(12) United States Patent
Lin et al.

(10) Patent No.: US 7,046,842 B2
(45) Date of Patent: May 16, 2006

(54) SYSTEM AND METHOD FOR COLOR CHARACTERIZATION USING FUZZY PIXEL CLASSIFICATION WITH APPLICATION IN COLOR MATCHING AND COLOR MATCH LOCATION

(75) Inventors: Siming Lin, Austin, TX (US); Dinesh Nair, Austin, TX (US); Darren Schmidt, Cedar Park, TX (US)

(73) Assignee: National Instruments Corporation, Austin, TX (US)

( * ) Notice: Subject to any disclaimer, the term of this patent is extended or adjusted under 35 U.S.C. 154(b) by 787 days.

(21) Appl. No.: 09/737,531

(22) Filed: Dec. 13, 2000

(65) Prior Publication Data

Related U.S. Application Data

(63) Continuation-in-part of application No. 09/375,453, filed on Aug. 17, 1999, now Pat. No. 6,757,428.

(51) Int. Cl.
*G06K 9/00* (2006.01)
(52) U.S. Cl. ...................... 382/165; 382/170
(58) Field of Classification Search ........ 382/162–167, 382/305, 170; 707/104.1
See application file for complete search history.

(56) References Cited

U.S. PATENT DOCUMENTS 5,085,325 A    2/1992   Jones et al.

(Continued)

FOREIGN PATENT DOCUMENTS

EP          0 657 839        6/1995

(Continued)

OTHER PUBLICATIONS

Vertan et al. "Embedding fuzzy logic in content based image retrieval" 19th International Conference of the North Americn, Fuzzy Information Processing Society 2000, p. 85-89, Jul. 2000.*

(Continued)

*Primary Examiner*—Jingge Wu
(74) *Attorney, Agent, or Firm*—Meyertons Hood Kivlin Kowert & Goetzel, P.C.; Jeffrey C. Hood; Jason L. Burgess

(57) ABSTRACT

A system and method for measuring the similarity of multiple-color images and for locating regions of a target image having color information that matches, at least to a degree, the color information of a template image. A color characterization method operates to characterize the colors of an image and to measure the similarity between multiple-color images. For each image pixel, the method determines a color category or bin for the respective pixel based on HSI values of the respective pixel, wherein the color category is one of a plurality of possible color categories in HSI color space. In various embodiments, the weight of the pixel may be fractionally distributed across a plurality of color categories, e.g., as determined by applying fuzzy pixel classification with a fuzzy membership function. The percentage of pixels assigned to each category is then determined. The percentage of pixels in each color category is then used as a color feature vector to represent the color information of the color image. A quantitative measurement of the color similarity between color images is then computed based on the distance between their color feature vectors. Once the color information of a template image has been characterized, a target image may be searched in order to locate regions within the target image having matching color information. In one embodiment, a coarse-to-fine heuristic may be utilized, in which multiple search stages of decreasing granularity are performed. A first-stage search may operate to identify a list of candidate match regions based on the city-block distance of the color feature vector computed using a sub-sampling scheme. These candidate match regions may then be examined in further detail in order to determine final matches.

33 Claims, 19 Drawing Sheets

U.S. PATENT DOCUMENTS

| | | | |
|---|---|---|---|
| 5,410,637 A | | 4/1995 | Kern et al. |
| 5,548,697 A | * | 8/1996 | Zortea .......................... 706/2 |
| 5,652,881 A | * | 7/1997 | Takahashi et al. .......... 382/162 |
| 5,751,450 A | | 5/1998 | Robinson |
| 5,799,105 A | | 8/1998 | Tao |
| 5,828,777 A | | 10/1998 | Suzuki |
| 6,229,921 B1 | | 5/2001 | Wenzel et al. |
| 6,272,239 B1 | * | 8/2001 | Colla et al. ................. 382/167 |
| 6,282,317 B1 | | 8/2001 | Luo et al. |
| 6,370,270 B1 | | 4/2002 | Nair et al. |
| 6,385,337 B1 | * | 5/2002 | Klassen ...................... 382/166 |
| 6,516,100 B1 | * | 2/2003 | Qian ........................... 382/305 |
| 6,625,308 B1 | * | 9/2003 | Acharya et al. ............ 382/168 |
| 6,757,428 B1 | * | 6/2004 | Lin et al. .................... 382/165 |

FOREIGN PATENT DOCUMENTS

| | | |
|---|---|---|
| EP | 0 751 475 | 1/1997 |
| WO | 99/23600 | 5/1999 |

OTHER PUBLICATIONS

Han et al. "Fuzzy color histogram: an efficient color feature for image indexing and retrival" Proc. 2000 ICASSP IEEE, vol. 4, pp. 2011-2014, Jun. 2000.*

Terry Caelli and David Reye "On the Classification of Image Regions by Colour Texture and Shape," Pattern Recognition, vol. 26, No. 4, pp. 461-470, 1993.

Michael J. Swain and Dana H. Ballard "Color Indexing," International Journal of Computer Vision, 7:1, pp. 11-32, 1991.

Marie-Pierre Dubuisson and Anil K. Jain "Fusing Color and Edge Information for Object Matching," IEEE, pp. 982-986, 1994.

International Search Report, Application No. PCT/US 00/22554, mailed Jul. 18, 2001.

K. Chen et al., "Similarity-Based Retrieved of Images Using Color Histograms", Proceedings of the SPIE, Jan. 26, 1999, XP000983710 chapters 2, 3.

J.R. Smith et al., "Tools and Techniques for Color Image Retrieval", San Jose, Feb. 1-2, 1996, Bellingham, SPIE, US, vol. 2670, Feb. 1, 1996, pp. 426-437, XPOOO642585, ISBN: 0-8194-2044-1 (whole document).

Datacube, Inc."Intelligent and Optimal Normalized Correlation for High-Speed Pattern Matching", Feb. 2000, 13 pages.

IMAQ™ "IMAQ Vision Concepts Manual" Oct. 2000, pp. 14-18 through 14-25.

* cited by examiner 9 x 9 Pixel Step Size

SYSTEM AND METHOD FOR COLOR CHARACTERIZATION USING FUZZY PIXEL CLASSIFICATION WITH APPLICATION IN COLOR MATCHING AND COLOR MATCH LOCATION

This application is a continuation-in-part of U.S. patent application Ser. No. 09/375,453 titled "System and Method for Color Characterization with Applications in Color Measurement and Color Matching", filed Aug. 17, 1999, now U.S. Pat. No. 6,757,428 whose inventors were Siming Lin and Dinesh Nair.

FIELD OF THE INVENTION

The present invention relates to a method for characterizing colors in an image. The invention also relates to a method for determining a measure of similarity between two color distributions of images or regions of interest using fuzzy pixel classification. The invention also relates to a method for locating regions of a target image that match a template image with respect to color characterization.

DESCRIPTION OF THE RELATED ART

Computer-implemented methods for characterizing the color information of an image or determining a measure of similarity between two color images have a wide array of applications in many fields. For example, in machine vision applications, color is a powerful descriptor that often simplifies object identification and information extraction from a scene. Color characterization, location, and comparison is an important part of machine vision and is used in a large class of assembly and packaging inspection applications, e.g., to detect missing, misplaced, or damaged color components, defects on the surfaces of color objects, etc.

In addition to the fields of industrial automation and machine vision, color characterization and color matching methods have important applications in many other fields such as content-based image retrieval (CBIR). In a content-based image retrieval system, a plurality of color images may be indexed. In the indexing step, color information regarding each image may be extracted and stored. A searching step may then be performed, where the stored color information is used to find one or more indexed images that match the color information of a template image.

Image processing and machine vision systems use several different color spaces, including RGB, HSI (or HSL) and CMY. In the RGB space, each color appears in its primary spectral components of red, green and blue. This RGB color space is based on a Cartesian coordinate system. The RGB model is represented by a 3-dimensional cube with red, green, and blue at the edges of each axis. Each point in the cube represents a color, and the coordinates of that point represent the amount of red, green and blue components present in that color. Because the red, green, and blue color components in RGB color space are highly correlated, it is difficult to characterize colors with intensity/luminance independent features.

The Hue, Saturation, Intensity (HSI) or Hue, Saturation, Luminance (HSL) color space was developed to specify color in terms that are easier for humans to quantify. The hue component is color as we normally think; such as orange, green, violet, and so on (a rainbow is a way of visualizing the range of hues). Thus, hue represents the dominant color as perceived by an observer. Saturation refers to the amount or richness of color present. Saturation is measured by the amount of white light mixed with a hue. In a pure spectrum, colors are fully saturated. Colors such as pink (red and white) and lavender (purple and white) are less saturated. The intensity or light component refers to the amount of grayness present in the image.

Colors represented in HSI model space may be ideal for machine vision applications for several reasons. First, HSI includes an intensity (luminance) component separated from the color information. Also, the intimate relation between hue and saturation more closely represents how humans perceive color. It may therefore be desirable to characterize colors in HSI space for color measurement and color matching.

HSI is modeled with cylindrical coordinates. One possible model is a double cone model, i.e., two cones placed end to end or an inverted cone below another cone (see FIG. 4). For information on the double cone model, please see "A Simplified Approach to Image Processing", Randy Crane, Prentice Hall, 1997. The hue is represented as the angle theta, varying from 0 degrees to 360 degrees. Saturation corresponds to the radius or radial distance, varying from 0 to 1. Intensity varies along the z-axis with 0 being black and 1 being white. When S=0, the color is gray scale with intensity I and H is undefined. When S=1, the color is on the boundary of the top cone base and is fully saturated. When I=0, the color is black and therefore H is undefined.

On the assumption that the R, G and B values have been normalized to range from 0 to 1, the following equations may be used to convert from RGB color space to HSI (or HSL) color space:

$$I=(R+G+B)/3$$

$$H = \cos^{-1}\left\{\frac{\frac{1}{2}[(R-G)+(R-B)]}{[(R-G)^2+(R-B)(G-B)]^{\frac{1}{2}}}\right\}$$

$$S = 1 - \frac{3}{(R+G+B)}[\min(R,G,B)]$$

The Intensity I (or Luminance L) may also be represented by the equation:

$$L=0.299R+0.587G+0.114B$$

which is a weighted sum of the RGB values.

The equation for H yields values in the interval [0°,180°]. If B/I>G/I then H is greater than 180° and is obtained as H=360°−H.

Prior art systems use various techniques to measure and match colors. Those skilled in the art will be familiar with 'thresholding' an image. To threshold a color image, a threshold is applied to each of the three planes that make up the image. In RGB mode, to select a particular color, one will need to know the red, green and blue values that make up the color. In RGB mode it is not possible to separate color from intensity. Therefore, a characterization algorithm such as histogram intersection based on RGB space will be intensity sensitive.

A color-indexing scheme based on using histogram intersection in RGB space was proposed by Swain and Ballard ("Color Indexing", Michael J. Swain, Internal Journal of Computer Vision, vol. 7:1, page 11–32, 1991). In Swain and Ballard's approach, the RGB space is first converted to an opponent-theory-based color space with axes black-white, red-green and blue-yellow. The color space is then divided into bins with the same number of bins in the red-green and blue-yellow axes but with a much coarser quantization in black-white axis. Color similarity is then computed by a histogram intersection method based on the color distribution in those bins. Let $D_{M,T}$ be the difference of the color information in the model image and the target image, then $$D_{M,T} = \text{diff}(H_M, H_T)$$

Where $H_M$ is the quantized color histogram of the model image, and $H_T$ is the quantized color histogram of the target image. diff is a function defining the similarity measure of the quantized histograms. The similarity measure of color images in the histogram intersection is defined as $$DI_{M,T} = \frac{\sum_{k=1}^{N} \min(H_M(k), H_T(k))}{\sum_{k=1}^{N} H_M(k)}$$

where, N is the total number of bins, $H_M(k)$ is the number of pixels from the model image in bin k and $H_T(k)$ is the number of pixels from the target image in bin k. It has been proved that the histogram intersection method is equivalent to computing the sum of absolute differences or city-block metric when the target image has the same size as the model image (M. Swain and D. Ballard, Color Indexing, International Journal of Computer Vision, vol. 7, no. 1, pp. 11–32, 1991). That is, the similarity measure can be defined as $$DI_{M,T} = \frac{\sum_{k=1}^{N} |H_M(k) - H_T(k)|}{\sum_{k=1}^{N} H_M(k)}$$

It can be seen from the above similarity measure that the histogram intersection method does not take into account the color similarity between a bin and its neighbors. For example, if the model image has all the pixels located in bin k but the target image has all the pixels located in bin k+1, the similarity computed from histogram intersection method is 0. When the number of bins is large, this will cause a very similar image classified as a completely different image with similarity 0. A more robust color similarity measure that takes the similarity of the neighboring bins into account is desirable.

Color constancy, which is the ability to have constant perception of a color over varying lighting conditions, as people do in most circumstances, is important when defining a similarity measure of color images. This is especially true for applications of image retrieval and machine vision. However, Swain and Ballard's histogram intersection method has been proved sensitive to lighting change (J. Hafner, Efficient color histogram indexing for quadratic form distance functions, IEEE Trans. on Pattern Analysis and Machine Intelligence, vol. 17, no. 7, 1995). A color characterization with color constancy capability is desirable.

U.S. Pat. No. 5,410,637 (Kern) uses fuzzy logic to establish acceptable pass/fail tolerances for production or inventory samples. The process first stores a series of training image samples which are labeled pass or fail according to visual inspections. The initial value of the tolerance is a super ellipsoid determined by the high/low value of the pass samples in the training set. A classifier template uses the super ellipsoid tolerances and ranks every sample in the training set. The process then employs fuzzy logic to obtain an optimized tolerance which minimizes the sum of ranking error between the classifier template and the visual ranks. The process essentially builds a pass/fail color classifier. This process cannot be used to measure the colors quantitatively in an image or to measure the quantitative color similarity between two objects in an image or in two separated images.

U.S. Pat. No. 5,085,325 (Jones) implements a color sorting system and method. The method creates a lookup table containing a series of 0's (accept) and 1's (reject) based on good and bad sample images. During the sorting process, the pixel value of the input image is used to address the lookup table, the output of the lookup table is either 1 or 0. If the number of rejects (1's) accumulated is larger than a specified number K, the input image is rejected. This color sorting method is based on a pixel-by-pixel comparison. A large memory is required to store the lookup table. Although a special hardware addressing approach can improve the processing speed, the cost of computation is still very high for sorting objects with complex colors.

U.S. Pat. No. 5,751,450 (Robinson) provides a method for measuring the color difference of two digital images as a single 'distance.' This 'distance' is an average of the color differences of all corresponding pixels of the two images. Similar to the Jones' patent as described above, the cost of computation of the distance is very high. This template image has to be stored in the computer memory for on-line color matching. If the size of the template is not the same as that of the target image, special operations for alignment or resizing the image must be done before the matching process can begin. A further drawback of this approach is that it is impossible to have scale and rotation-invariant color matching based on the 'distance' measure.

U.S. Pat. No. 5,218,555 (Shigeru Komai) discloses a system for judging color difference between a single color and a reference color in CIE Lab color space. The reference color value (L,a,b) is input from a computer keyboard and the Euclidean distance between the reference color and the inspected color is computed. If the Euclidean distance is smaller than a preset threshold $e_1$, then it is judged that there is no substantial color difference. If the Euclidean distance is larger than a preset threshold $e_2$, then it is judged that there is a substantial color difference. If the Euclidean distance is between larger than $e_1$ and smaller than $e_2$, then fuzzy logical rule is applied to make decision about the difference. This system takes the human uncertainty of judging color difference into account to achieve a better judgment on the difference of two colors.

In the prior art, color matching based on pixel-by-pixel comparisons is sensitive to the change on image shift, scale and rotation. The computation cost of pixel-by-pixel comparison is very expensive and is difficult to accomplish in real time. A more efficient color characterization method is desirable.

In the prior art, methods for judging color difference using fuzzy logic only work for judging the difference between two single colors to produce a pass/fail result. A system that can make robust measurement of color difference between objects with multiple colors in color machine vision is desirable.

In the prior art, methods for color similarity measure based on color histogram do not take the similarity between the neighboring bins into account. Each pixel is only classified as belonging to one bin. Therefore, two colors in two close bins are considered to be completely different. A fuzzy pixel classification method based on fuzzy set theory to allow a pixel to belong to multiple bins according to a fuzzy membership function is desirable. The prior art of color matching is also sensitive to light intensity change. A more accurate and intensity-insensitive color characterization and comparison method is desirable. More specifically, it is desirable for machine vision applications to more effectively characterize and measure the color similarity of multiple-color images.

In the prior art, a method for automatically determining color features of a template image and using those features to locate color match regions in a target image has thus far been lacking. For example, some prior art methods require users to manually select or specify color features of the template image to be used in searching, e.g., by choosing a dominant color of the template image. Also, users may be required to manually threshold the template image, and this threshold information may be used in searching. Thus, a method to automatically determine color features of a template image and use these features to perform a color match search is desirable.

SUMMARY OF THE INVENTION

In view of the foregoing, an object of the present invention is to provide an improved system and method for effectively and accurately characterizing color for machine vision applications.

Another object of the invention is to provide improved systems and methods for locating regions or objects of a target image having color information that matches, at least to a degree, the color information of a template image.

Another object of the invention is to provide improved systems and methods for effectively and accurately measuring the color similarity of multiple-color images.

Still another object of the invention is to provide a machine vision system for measuring multiple colors, including black and white color, while the color measuring system is intensity independent within a large range of intensity variation.

Still another object of the invention is to provide a machine vision system for measuring multiple colors with different saturation values in an image, while the color measuring system comprises a wide range of intensity variation and is intensity independent.

Still another object of the invention is to provide a machine vision system for color matching that may quantitatively measure the color difference between two images or between two regions of interest in the same image.

Still another object of the invention is to provide a machine vision system for color matching that is not required to calculate the color difference based on pixel-by-pixel comparisons.

Still another object of the invention is to provide a machine vision system for color matching that is intensity independent within a large range of intensity variation.

Still another object of the invention is to provide a machine vision system for color matching that can distinguish colors with different saturation values.

Still another object of the invention is to provide a machine vision system for color matching that compensates for black and white color distribution in images.

A color characterization method is described herein which operates to characterize the colors of an image or region of an image. The image may be obtained in HSI format, or alternatively may be converted from another format to HSI. For example, an image may be acquired in HSI format by National Instruments color image acquisition board PCI-1411. The color characterization divides the HSI space into n color categories (also referred to as subspaces or bins), where n is the number of color categories of interest. The number of different color categories in the color space may be dependent on a desired complexity of the color characterization.

For each image pixel, the method determines a color category for the respective pixel based on values of the respective pixel, i.e., hue, saturation and intensity values, wherein the color category is one of a plurality of possible color categories or bins (or sub-spaces) in the HSI space. The number of pixels assigned to each category is then counted and normalized by the total number of pixels in the selected region of interest (or entire image), i.e., the percentage of pixels in each color category characterizes the colors of the image or ROI. The percentage of pixels in each color category may also be used as a quantitative measurement of the color distribution of the image.

In various embodiments, fuzzy membership or other functions may be applied to determine a desired distribution of pixels among color space bins. For example, pixels may be assigned to multiple bins during the color characterization method, e.g., on a fractional weighted basis. This increased complexity may result in more accurate color match location results. For each pixel, a fuzzy membership or other function may be applied, based on where the pixel falls within the bin and/or where the pixel falls within the color space, based on color information of the pixel. This function may determine a contribution that the pixel should make to one or more bins. For example, the function may determine a set of values to assign to each of the one or more bins. For example, if the pixel falls near the edge of a bin (with respect to the portion of the color space that the bin corresponds to), then the function may determine that a portion of the weight of the pixel should be contributed to the neighboring bin that the pixel is near. The function may determine a contribution that the pixel should make to any number of bins, wherein the sum of these contributions is 100%. Any of various types of fuzzy membership functions may be applied, including, triangle fuzzy membership functions, trapezoid fuzzy membership functions, and step fuzzy membership functions.

Another embodiment of the invention comprises a color match location method that may use the color characterization method described above. Once the color information of a template image has been characterized, a target image may be searched in order to locate regions within the target image having matching color information. In one embodiment, a coarse-to-fine heuristic may be utilized, in which multiple passes of decreasing granularity are performed. A first-pass search may operate to identify a list of candidate match regions. For example, the target image may be stepped across at a step interval, wherein color information of a target image region is characterized at each step, using the color characterization method described above. For each target image region, a measure of difference between the color characterization information of the target image region and the color characterization information of the template image may be calculated. If this difference is smaller than a threshold value, then the target image region may be added to a list of candidate regions.

For each candidate region, a larger area (region) proximal to the candidate region may then be searched, e.g., by stepping through the proximal area using a smaller step size than was used in the first-pass search. At each step, color information of a target image region within the proximal area may be characterized and compared to the template image color information. The target image region within the area proximal to the initial candidate region that best matches the color information of the template image may be considered a second-pass candidate region. The matching criteria used to determine whether a target image region is a second-pass candidate region are preferably stronger than the criteria used in the first-pass search, i.e., the value calculated as the difference between the color information of the target image region and the color information of the template image must be smaller than a smaller threshold value than was used in the first-pass search.

The process described above may be repeated for as many repetitions as desired. With each repetition, the step size used is preferably smaller and the measure of color difference preferably must be smaller in order for a region to be considered a candidate, e.g., until a predetermined number of search passes are performed or until step sizes are as small as possible and/or matching criteria are as strict as possible. Once the final repetition is performed, any target image regions that still remain as candidate matching regions may be considered as final matches.

The color match location method described above may be useful in many applications. For example, the method may be especially useful in applications that do not require an exact location of the template image within the target image to be determined, with sub-pixel accuracy. For example, some applications may need to very quickly determine match locations to a degree of accuracy, but may not require the locations to be determined with the degree of preciseness that may be obtained if pattern information is also used in the matching. This more coarse location determination may be suitable for many applications, e.g., to determine whether all color-coded pills are present in a blister pack. The method may also be especially suitable for applications that do not require the spatial orientation of the matches to be determined.

It is noted that in addition to the method described above which uses the color characterization method to locate regions of a target image that match the color information of a template image, the color characterization method may also be used to determine color similarity of a template image and a target image as a whole. For example, some applications do not require a target image to be searched for color match regions, but may simply require a determination of how closely the color information of the entire target image matches the color information of the template image.

BRIEF DESCRIPTION OF THE DRAWINGS

A better understanding of the present invention can be obtained when the following detailed description of the preferred embodiment is considered in conjunction with the following drawings, in which.

Figure 1:
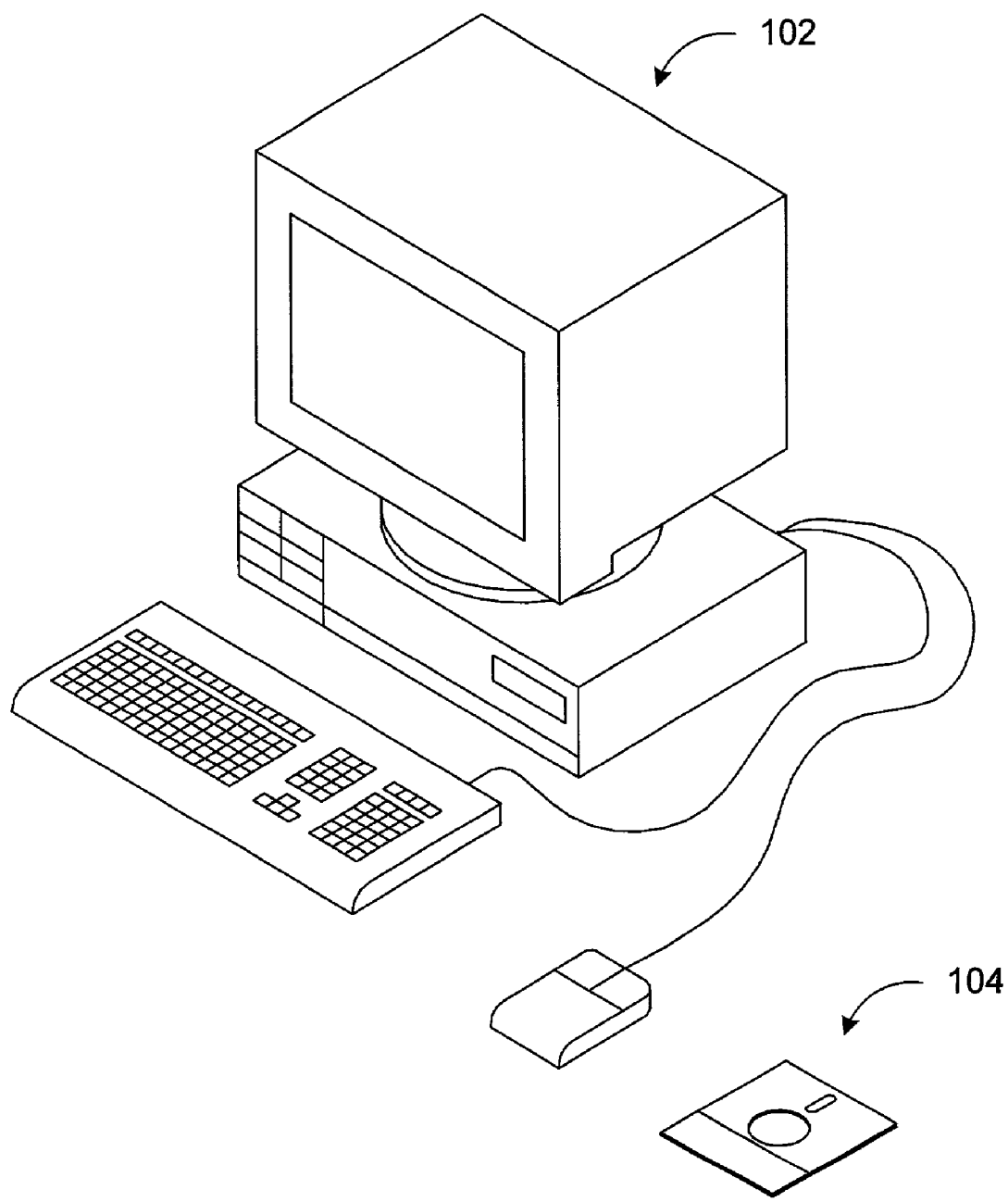
FIG. 1 illustrates a computer system which performs color characterization and/or color matching according to one embodiment of the present invention.

While the invention is susceptible to various modifications and alternative forms specific embodiments are shown by way of example in the drawings and are herein described in detail. It should be understood, however, that drawings and detailed description thereto are not intended to limit the invention to the particular form disclosed, but on the contrary the invention is to cover all modifications, equivalents and alternatives falling within the spirit and scope of the present invention as defined by the appended claims.

DETAILED DESCRIPTION OF THE FIGURES

FIG. 1—Computer System

FIG. 1 illustrates a computer system 102 which may perform color match location according to one embodiment of the present invention. The computer system 102 may comprise one or more processors, a memory medium, display, and an input device or mechanism, such as a keyboard or mouse, and any other components necessary for a computer system.

The computer system 102 may perform a color characterization analysis of a template image and may use information determined in this analysis to locate regions of a target image which match the template image, with respect to color characterization. Images that are to be matched are preferably stored in the computer memory and/or received by the computer from an external device.

The computer system 102 preferably includes one or more software programs operable to perform the color match location. The software programs may be stored in a memory medium of the computer system 102. The term "memory medium" is intended to include various types of memory, including an installation medium, e.g., a CD-ROM, or floppy disks 104, a computer system memory such as DRAM, SRAM, EDO RAM, Rambus RAM, etc., or a non-volatile memory such as a magnetic medium, e.g., a hard drive, or optical storage. The memory medium may comprise other types of memory as well, or combinations thereof. In addition, the memory medium may be located in a first computer in which the programs are executed, or may be located in a second different computer which connects to the first computer over a network. In the latter instance, the second computer may provide the program instructions to the first computer for execution. Also, the computer system 102 may take various forms, including a personal computer system, mainframe computer system, workstation, network appliance, Internet appliance, personal digital assistant (PDA), television system or other device. In general, the term "computer system" can be broadly defined to encompass any device having a processor which executes instructions from a memory medium.

The software program(s) may be implemented in any of various ways, including procedure-based techniques, component-based techniques, and/or object-oriented techniques, among others. For example, the software program may be implemented using ActiveX controls, C++ objects, Java objects, Microsoft Foundation Classes (MFC), graphical programming techniques or other technologies or methodologies, as desired. A CPU, such as the host CPU, executing code and data from the memory medium comprises a means for performing color match location according to the methods or flowcharts described below.

Figure 2:
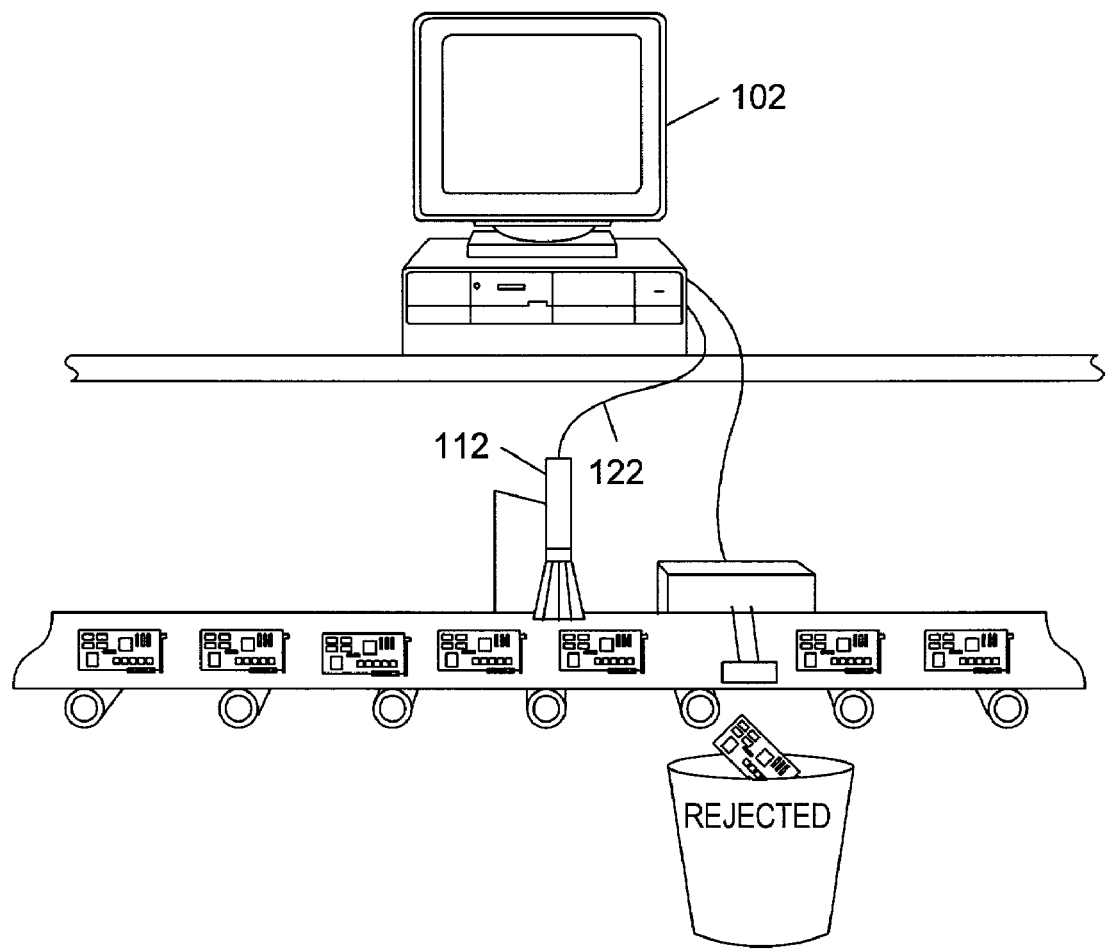
FIG. 2 illustrates an exemplary image acquisition (video capture) system for acquiring images.

FIG. 2—Machine Vision System

FIG. 2 illustrates a machine vision system or image acquisition system, which is an example of one application of the present invention. The color match location techniques described herein may be used in various types of image processing, machine vision or motion control applications. For example, the computer 102 may be embodied in various form factors and/or architectures, e.g., a robot or embedded device, among others. It is also noted that the color match location techniques described herein may be performed in any of various manners, either in software, programmable logic, or hardware, or a combination thereof.

In the machine vision system of FIG. 2, computer system 102 is coupled to a camera 112 and operates to receive one or more images. The computer system 102 may be operable to perform a color characterization analysis to characterize the colors in a template image. In the present application, the term "template image" is used to refer to either an entire image, or a portion of an image, e.g., a region of interest (ROI). The computer system 102 may also be operable to perform a search of a target image to locate target image regions that "match" the color characterization of the template image. As described below, the search may be performed to locate matching regions with any of various degrees of exactness, as appropriate for a particular application.

Figure 3:
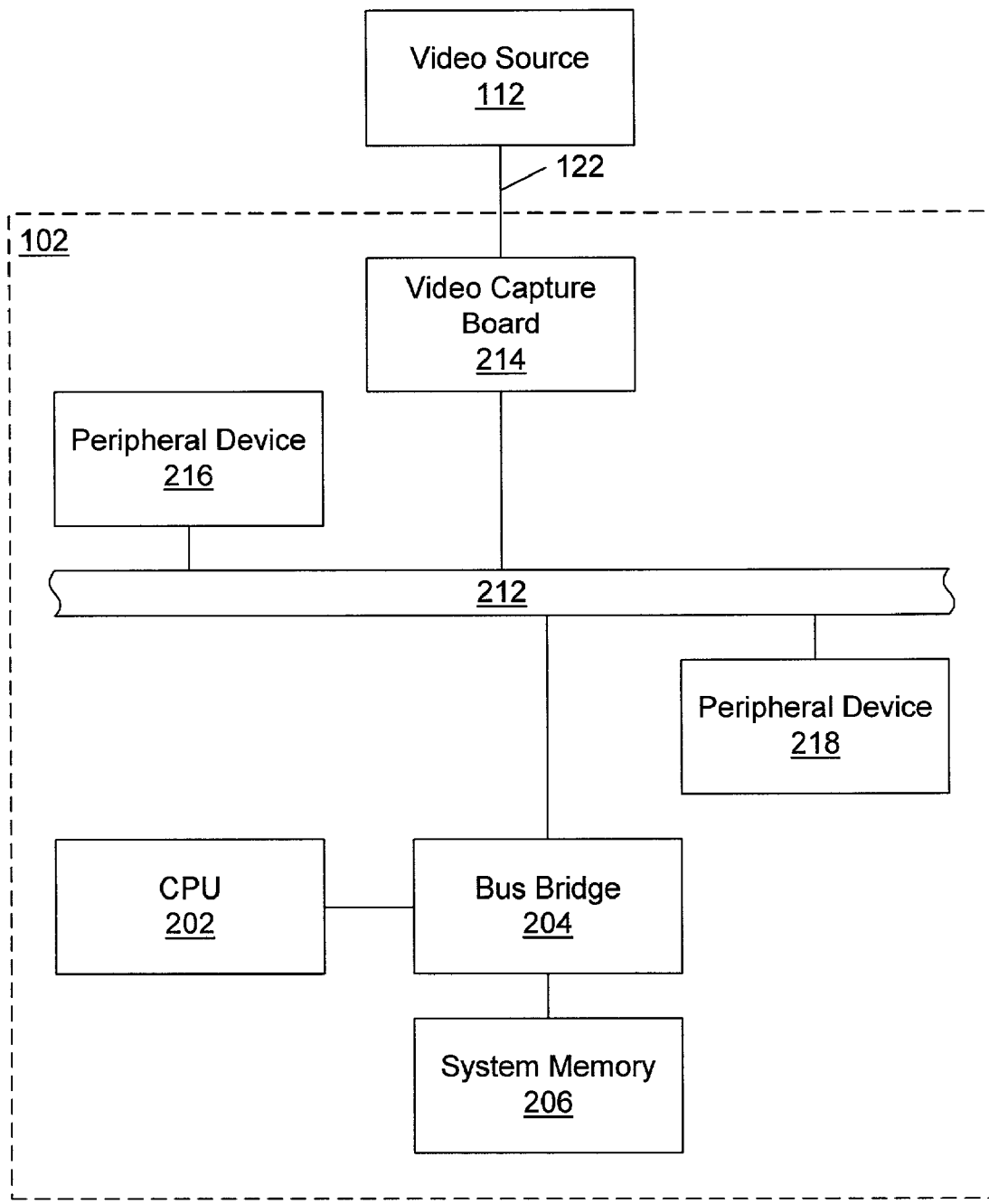
FIG. 3 is a high-level block diagram of the image acquisition system according to one embodiment.

FIG. 3—Image Acquisition System Block Diagram

FIG. 3 is a high-level block diagram of the image acquisition system of FIG. 2 for acquiring an image for color characterization and/or color matching according to the present invention. It is noted that the block diagram of FIG. 3 is exemplary only, and other computer system architectures may be used as desired. For example, the present invention may be implemented in a "smart camera", which integrates a sensor, analog to digital (A/D) converter, CPU, and communications devices together in a single unit. The present invention may be embodied in other architectures, devices, or embodiments, as desired.

As shown in FIG. 3, the host computer 102 preferably comprises a CPU 202, a bus bridge 204, system memory 206, and a peripheral bus 212. The CPU 202 is coupled to the bus bridge 204. The bus bridge 204 is coupled to the system memory 206 and the CPU 202, and couples to the peripheral bus 212. In the preferred embodiment, the peripheral bus 212 is the PCI expansion bus, although other types of buses may be used.

In this embodiment, the host computer system 102 also includes a video capture board (also referred to as an image acquisition board) 214 which is adapted for coupling to the video source 112. The video capture board 214 is preferably coupled to the peripheral bus 212. In addition to the video capture board 214, other peripheral devices (216 and 218) may be coupled to the peripheral bus 212, such as audio cards, modems, graphics cards, network cards, etc.

The video source 112 supplies the analog or digital video signals to the video capture board 214. The video capture board 214 transfers digitized video frames to the system memory 206 through peripheral bus 212 and bus bridge 204. In this embodiment, the video capture board 214 acquires the target image and transfers it to system memory 206. The user of the computer 102 may then select one or more regions of interest (ROI) in the target image which are desired to be searched for regions having color information that matches the color information of a template image. The ROI may be the entire target image or a portion of the target image.

The system memory 206 may store a template image. In a color match location application, the system memory 206 may store the color characterization information of the template image instead of, or in addition to, the actual template image. The system memory 206 also preferably stores software according to one embodiment of the present invention which operates to characterize the color information (color characterization software) of images, such as the template image and/or one or more acquired or specified target images. Thus the color characterization software in the system memory may operate on the template image to produce the color characterization information. The system memory 206 may also receive and/or store one or more other images, such as selected ROIs in the template image or another image, or acquired target images or target image objects. The system memory 206 also preferably stores software according to one embodiment of the present invention which operates to perform a color match location method (color match location software), as described below.

The term "image," as used herein, may refer to any of various types of images. An image may be a gray-level or color image. An image may also be a complex image, in which pixel values have a real part and an imaginary part. An image may be obtained from any of various sources, including a memory medium. An image may, for example, be obtained from an image file, such as a BMP, TIFF, AIPD, PNG, JPG, or GIF file, or a file formatted according to another image format. An image may also be obtained from other sources, including a hardware device, such as a camera, frame grabber, scanner, etc. The term "image" may also refer to an entire image or to a portion or region (ROI) of an image.

It is noted that, in a color match location application, the color characterization information of the template image may be pre-calculated and stored in the computer, and the actual template image is then not required to be stored or used for subsequent color match location operations with respective target images. Thus, when a target image is acquired, the color characterization software characterizes the colors in the target image and may compare this color information with the pre-computed color information of the template image.

The present invention is preferably implemented in one or more software programs which are executable by a processor or CPU. The software program(s) of the present invention are preferably stored in a memory medium of a computer as described above.

Figure 4:
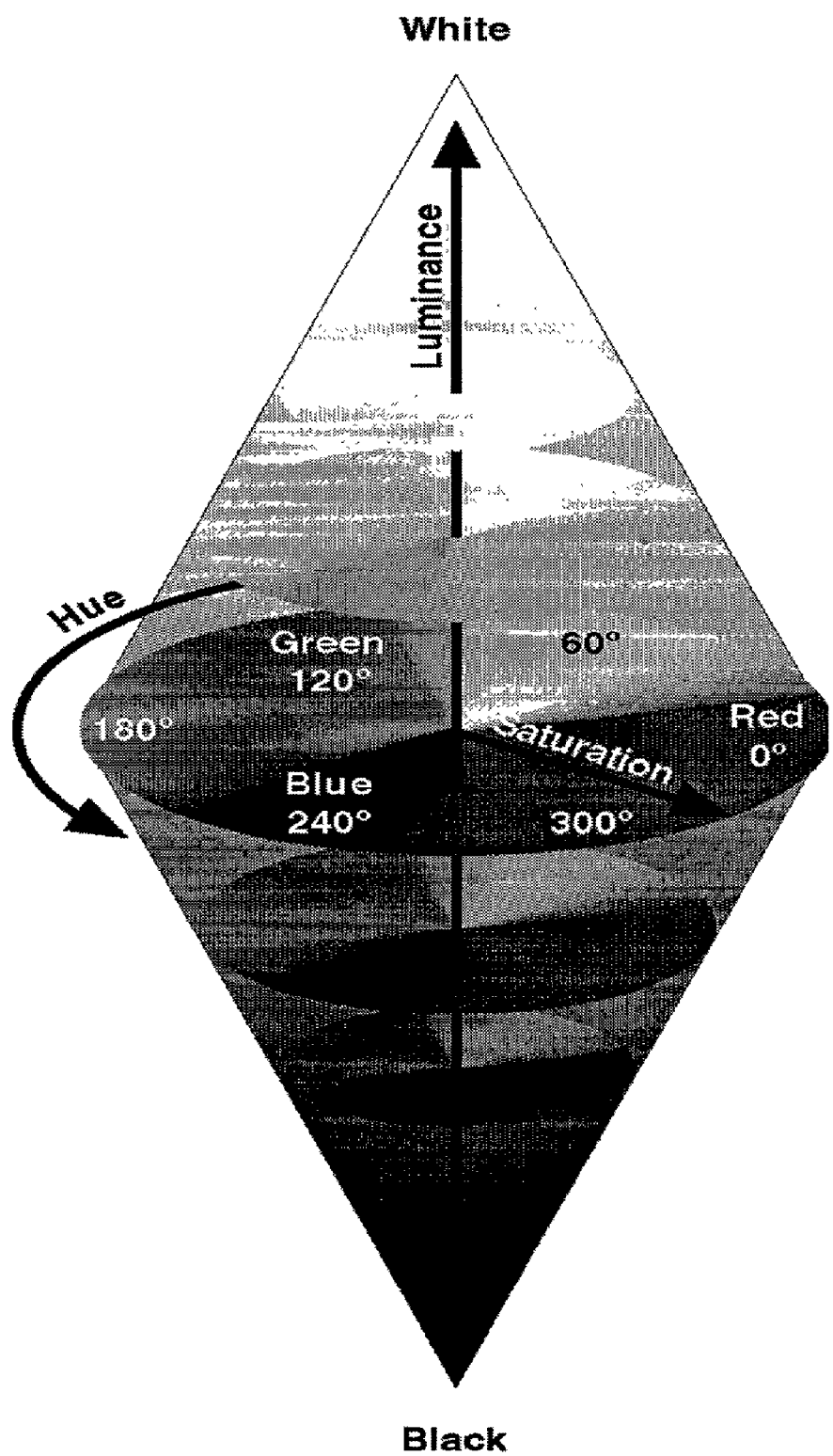
FIGS. 4, 5A and 5B are graphical representations of HSI color space.
Figure 5A:
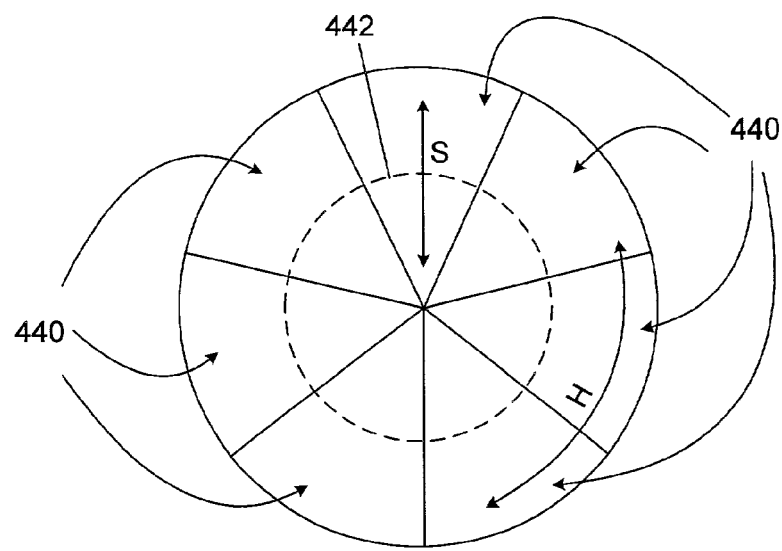
Figure 5B:
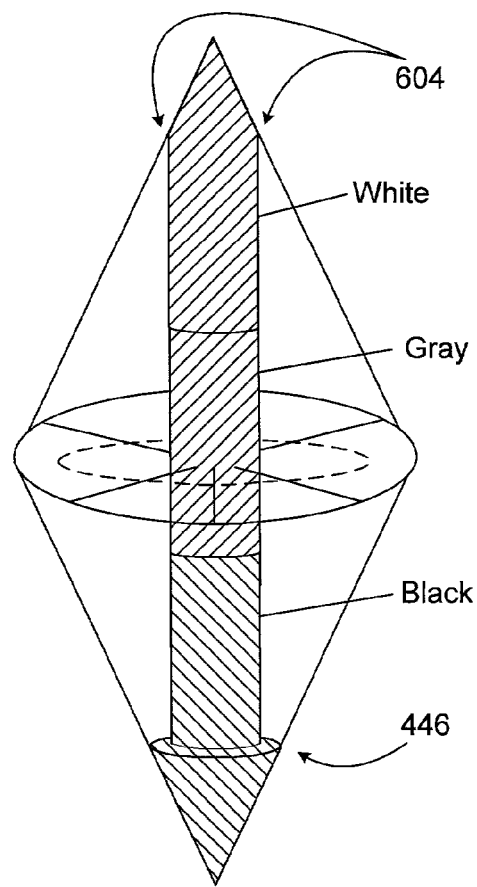

FIGS. 4, 5A, 5B—HSI Color Space

In one embodiment, characterizing the color information of a template image and/or target image may utilize HSI (hue, saturation, intensity) information. The HSI information of individual pixels of an image may be analyzed, and the pixel-specific results may be compiled in order to characterize the image based on color. In one embodiment, the color characterization method divides the color spectrum or color space into categories or "bins" (also called subspaces), primarily according to hue and saturation values, and then operates to assign pixels to respective ones of these bins. The total number of pixels (or percentage of pixels) in an image that fall into each category or bin of the color spectrum may then be used as the basis of the color characterization.

FIG. 4 illustrates the possible hue, saturation, and intensity values (the color spectrum) as a 3-dimensional space or volume. The color information of a given pixel may be represented as a vector or point within the 3D color space or volume shown in FIG. 4. The vector's location represents the hue, saturation, and intensity of the pixel.

Hue represents the color shade of a pixel and is shown as an angle of a radial line in the circle in FIG. 4. FIG. 5A illustrates a cross section of FIG. 4. As shown in FIG. 5A, hue is represented as an angular value ranging from 0–360 degrees.

Saturation refers to a color's freedom from mixture or dilution with white. Saturation is represented in FIG. 4 as the radial distance of a line on the circle, i.e., the distance from the center of the circle. Saturation may be more easily seen in the cross section of FIG. 5A. Saturation typically is measured in the range of 0 to 1, with 0 being at the center of the circle and 1 being at the outside perimeter of the circle. Thus, hue and saturation are essentially represented in polar coordinates to describe a point or location on the circle of FIGS. 4 and 5A.

Intensity, sometimes referred to as light or luminance, refers to the degree of shade in a pixel and is represented on the vertical scale of FIG. 4, i.e., vector locations above or below the circle. The terms luminance and intensity are interchangeable throughout this description. Intensity values typically range from 0 to 1, with 0 being pure black and 1 being pure white. The intensity value 0 is represented at the apex of the bottom cone, and the intensity value 1 is represented at the apex of the top cone.

In one embodiment of a color match location method, the method used to characterize the color information of a template image and the method used to characterize the color information of a target image may be the same.

Before color characterization occurs, the color space of FIG. 4 may be partitioned into color categories. The color space may be partitioned into any number of categories or bins. The number of categories or bins determines the granularity or resolution of the color characterization. For example, for some applications a large degree of similarity between a template image and a target image region may be desired in order for the target image region to be considered as a match. Thus, a large number of categories or bins may be required in this instance. In various embodiments, user input may be received which specifies the desired complexity of the color characterization. In one embodiment, three possible complexity levels may be specified, these being low, medium, and high.

In the preferred embodiment, the low complexity level comprises 17 possible categories or bins. In the low complexity level, the hue plane (FIG. 5A) is divided into seven different bins (or pie-shaped wedges) 440 for the seven possible natural colors, and the saturation plane is divided into two regions, thereby creating 14 (7×2) bins. The seven possible natural colors comprise the 7 standard colors of the color spectrum, these being: red, orange, yellow, green, blue, indigo and violet. The two regions of the saturation plane are defined by a radial distance threshold 442, preferably 0.3 on a scale from 0 to 1. The seven different bins of the hue plane and the two regions or bins of the saturation plane thereby create 14 possible categories or bins in the hue/saturation plane. Three additional color categories are allotted for the pixel being characterized as black, gray, or white, thereby creating a total of 17 possible categories (14+3).

FIG. 5B illustrates the areas within HSI color space which may be categorized as either black, gray, or white. In general, the color of a specific pixel may be characterized as black, gray, or white if the saturation value is very low. The black, gray, and white categories are discussed in more detail below.

The medium complexity level may comprise 31 possible categories or bins. In the medium complexity level, the hue plane (FIG. 5A) is divided into 14 different color categories 440 and the saturation plane is divided into two regions, thereby creating 28 (14×2) bins. Thus, in the medium complexity level, the hue plane is divided into 14 pie-shaped wedges, and the saturation plane is further sub-divided into 2 regions defined by a radial distance threshold 442, preferably 0.3 on a scale from 0 to 1, thereby creating 28 possible color categories or bins in the hue/saturation plane. Three additional color categories are allotted for the pixel being black, gray, or white, thereby creating a total of 31 possible color categories (28+3).

The high complexity level may comprise 59 possible color categories or bins. In the high complexity level, the hue plane (FIG. 5A) is divided into 28 different bins 440, and the saturation plane is divided into two regions, thereby creating 56 (28×2) bins. Thus, in the high complexity level, the hue plane is divided into 28 pie-shaped wedges, and the saturation plane is further sub-divided into 2 regions defined by a radial distance threshold 442, preferably 0.3 on a scale from 0 to 1, thereby creating 56 possible color categories or bins in the hue/saturation plane. Three additional color categories are allotted for the pixel being black, gray, or white, thereby creating a total of 59 possible categories (56+3).

The saturation categorization, i.e., the location of the radial distance threshold 442, is preferably set to a default value, but may also be adjusted by the user setting the Learn Sat Threshold 604. The saturation threshold typically is only adjusted when color characterization is performed on images with little variance in color saturation. In another embodiment, the number of saturation divisions may be increased, for example, to 3 (or more), or may be decreased to 0 (i.e. colors are not divided with respect to saturation level).

Figure 6:
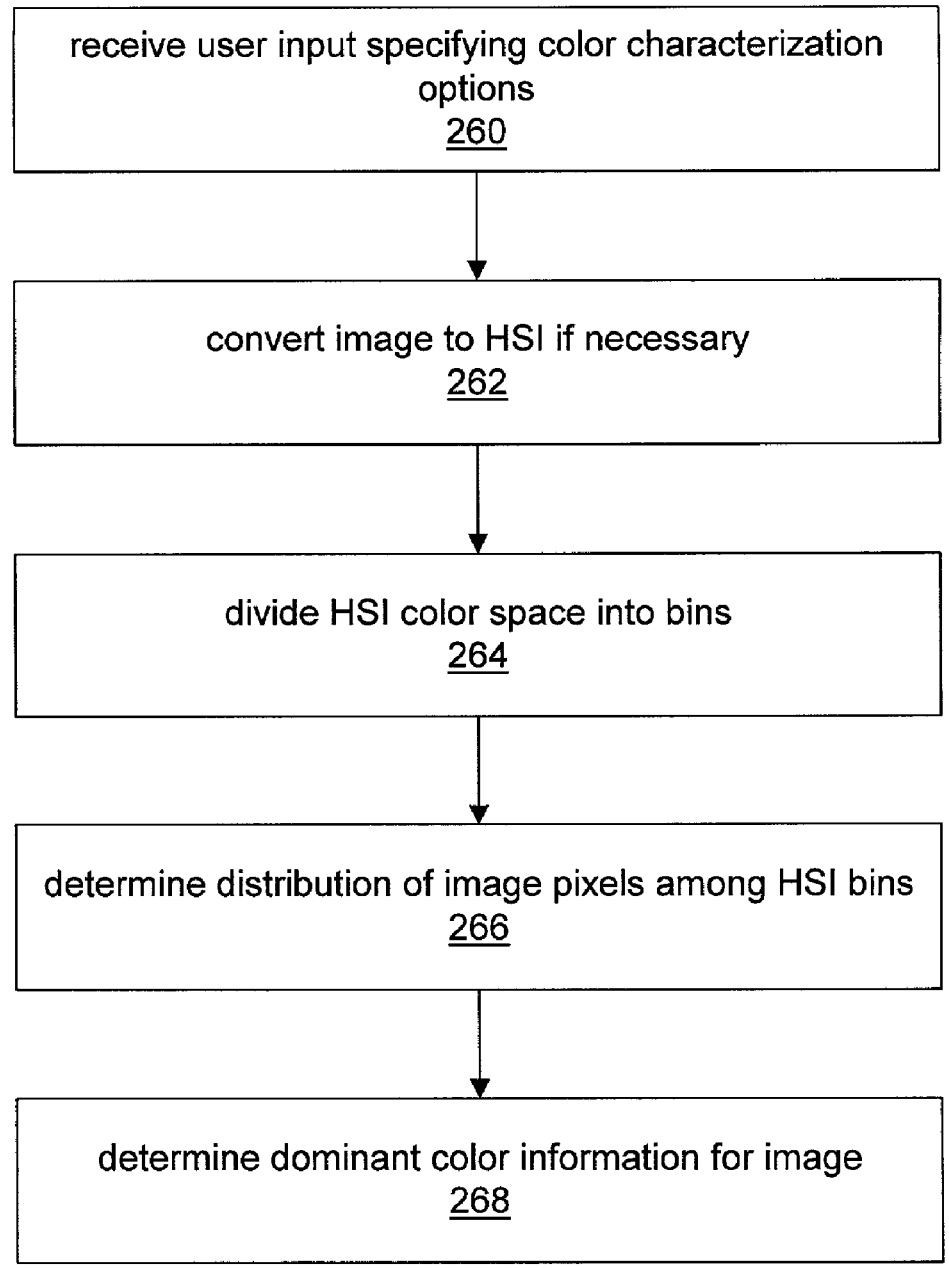
FIG. 6 is a flowchart diagram illustrating one embodiment of a method for characterizing color information of a template image and/or a target image.

FIG. 6—Color Characterization Method

FIG. 6 is a flowchart diagram illustrating one embodiment of a method for characterizing color information of a template image and/or a target image. In one embodiment, the color characterization method shown in FIG. 6 may be utilized in step 252 of the color match location method shown in FIG. 8 below, to perform a color characterization of a template image. The color characterization method shown in FIG. 6 may also be utilized in step 254 of FIG. 8 to perform color characterization on regions of a target image during a color match location search.

It is noted that FIG. 6 represents one particular embodiment of a color characterization method. Various applications may require different levels of sensitivity with respect to characterizing colors in a template image and/or classifying target image regions as color matches. Various applications may also have different computational efficiency requirements. Thus, in alternative embodiments, any of various color characterization methods may be utilized.

It is noted that, for a template image, the color characterization method shown in FIG. 6 may be performed once and the color information for the template image may be stored and used as necessary. For a target image, the method of FIG. 6 may be performed multiple times for various regions of the image as the target image is searched.

The embodiment illustrated in FIG. 6 involves analyzing an image with respect to HSI color information. As shown in step 260, user input may be received which specifies various color characterization method options. For example, the user input may specify a color sensitivity level to use in analyzing the image, i.e., a desired resolution of color information. In one embodiment, the user may select one of three sensitivity levels, these being low, medium, and high. As described above with reference to FIG. 5A, the sensitivity level may determine the number of categories or bins into which to divide the HSI color space. It is noted that the number of color categories may be set to any number or level, as desired. Alternatively, a default color characterization method may be used, and user input may not be used.

In step 262, the image may be converted to HSI format. Images are typically stored or received in RGB (Red, Green, Blue), Redness/Greenness, CMY, or HSI format. Thus, if an image is not in HSI format when received, it may be automatically converted to HSI format in step 262. The conversion process, when necessary, may analyze an image pixel by pixel, applying an algorithm that converts the current color format to the HSI format. It is noted that alternative embodiments of color characterization methods may utilize other color representation formats, such as RGB or CMY, among others. In these embodiments, for example, the RGB or CMY color spaces may be divided into color categories or bins, and pixels may be assigned to these bins.

In step 264, the HSI color space may be partitioned into categories or bins, such as described above with reference to FIGS. 4 and 5. The number of bins to divide the space into may utilize color sensitivity information received in step 260. Step 264 may simply involve storing information that specifies the different bins.

Figure 7:
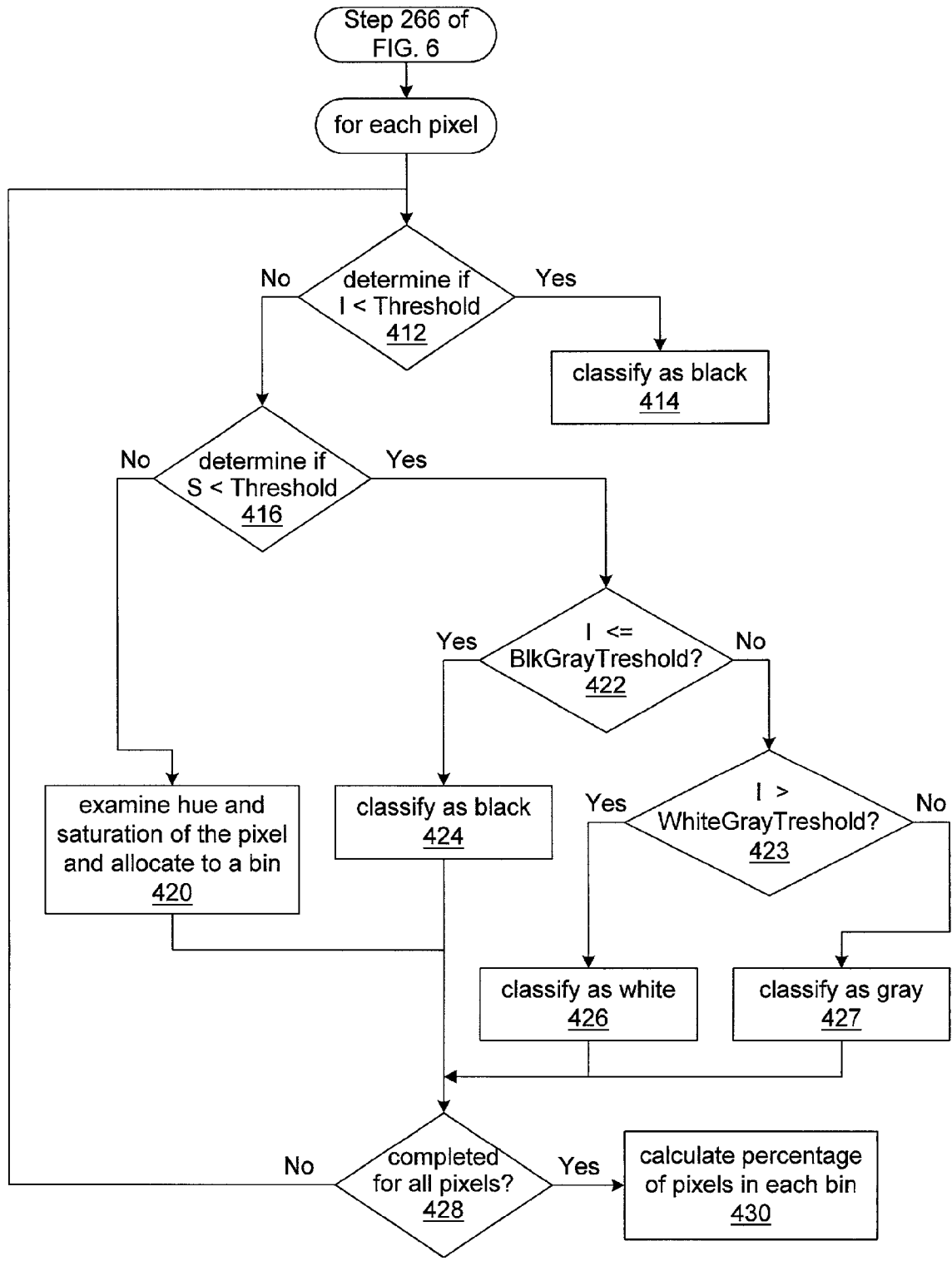
FIG. 7 is a flowchart diagram illustrating one embodiment of a method for analyzing image pixels in order to determine a pixel distribution among HSI color bins.

In step 266, the image (or ROI) may be analyzed pixel by pixel, in order to determine the pixel distribution among the HSI bins. FIG. 7 illustrates one embodiment of step 266 in detail. In one embodiment, the user may specify one or more colors which should be ignored in performing the pixel distribution. For example, the user may specify that black, gray, white or some combination of these or other HSI colors should be ignored. This may be useful, for example, if the template image and/or the target image have background colors that should be ignored for color matching purposes.

In one embodiment, pixels may be examined at the time that the HSI bin distribution is performed, so that pixels corresponding to certain bins are ignored. In another embodiment, this consideration may be performed after the pixel distribution is performed. For example, for each bin corresponding to a color that should be ignored, the number or percentage of pixels assigned to that bin may be set to zero after the distribution is performed, and the pixel percentages in the remaining bins may be normalized to sum to 100 percent. This latter embodiment may result in a more efficient color characterization method.

In the description above, each examined pixel is assigned to a single category or bin. In alternative embodiments, pixels may be assigned to multiple bins, e.g., on a weighted basis. For example, if a pixel falls near an "edge" of a bin, with respect to the portion of color space represented by that bin, then a fraction of that pixel's weight may be assigned to a neighboring bin. The determination on how to distribute a pixel among multiple bins may be performed in any of various ways, including through the use of a fuzzy membership function. Fractional distribution of pixels is further discussed below.

In one embodiment the color characterization method may also involve determining one or more color categories which are characterized as dominant color categories of the image, as shown in step 268, wherein the one or more dominant color categories are assigned a relatively larger proportion of image pixels, with respect to other color categories of the color space.

The determination of dominant color categories may be performed in any of various ways. For example, in one embodiment the categories may be sorted with respect to pixel allocation percentage, and the category with the highest percentage may then be examined. If this percentage falls at or above a certain ratio value T, which may be a default value or may be specified by a user, then this color category may be considered as a single dominant color category for the image. If this percentage is below the value T, then the color category with the next largest percentage of pixel allocation may be considered as a second dominant color category for the image, etc., until the sum of the percentages of the examined bins is at or above the value T. Thus, there may be multiple dominant color categories for an image. In one embodiment it may be required that the percentage of pixels in the largest category be at least of a certain threshold value in order for the image to have any dominant color categories.

In the preferred embodiment, the dominant color information is determined only for the template image, i.e., this computation may be omitted when performing a color characterization analysis of a target image region. The dominant color information of a template image may be utilized when comparing the color information of the template image to the color information of a target image, as described below.

FIG. 7—HSI Bin Pixel Distribution

FIG. 7 is a flowchart diagram illustrating one embodiment of step 266 of FIG. 6, in which pixels of an image are assigned to appropriate HSI space bins. The method shown in FIG. 7 may be performed for each pixel of an image or for only a subset of the pixels. For the template image, the method would typically be performed for each pixel, in order to obtain as much color information for the template image as possible. The color characterization analysis for the template image may only need to be performed once, and may be performed "offline", i.e., does not need to be performed in real time as a target image is searched for color match regions. Thus, once the color characterization information has been obtained for the template image, it may not be necessary to have the template image in memory for a color match location procedure.

For each region of the target image that is searched, it may be desirable to examine only a subset of the region's pixels, since categorizing every pixel of the region into a bin may be computationally expensive, and many regions in the target image may need to be searched. In many cases, analyzing a subset of pixels in each target image region may be sufficient, e.g., in order to perform a coarse-grained search that identifies candidate regions that can then be analyzed in more detail. The sample pixel subset may be generated using any of various sampling techniques, such as grid-based sampling, random sampling, or other non-uniform sampling.

In step 412 the method determines if the intensity value of the pixel is below a certain threshold, which could be specified by the user as some small value close to 0. FIG. 5B illustrates the intensity threshold 446. The intensity threshold 446 is preferably a decreasing function of the saturation. The intensity threshold 446 may be set by the computer or in some embodiments may be selected by the user. In one embodiment, on the assumption that hue, saturation and intensity values have been normalized to range from 0 to 255, the intensity threshold BlkThreshold is specified as a function of the saturation as shown below:

on which half of the intensity plane the pixel resides in. In other words, the hue and saturation analysis of step 420 is not necessary because a pixel with a saturation value less than the saturation threshold is not distinguishable from other pixels with similar saturation values and different hue values. If the pixel is on the lower portion of the intensity plane, i.e., I<=BlkGrayThreshold, the pixel is categorized as black in step 424. Otherwise, the pixel is examined in step 423 to determine whether the intensity value falls on the upper portion of the intensity plane, i.e., I>WhiteGrayThreshold. If so, then the pixel is categorized as white in step 426. Otherwise, the pixel is categorized as gray in step 427. Values for BlkGrayThreshold and WhiteGrayThreshold may be pre-specified based on the importance of black, gray, and white color in the particular application. In one embodiment, the threshold values may be set to divide the intensity plane into three equal portions, which puts the same weight on black, gray, and white colors. After a pixel is categorized as either black, gray, or white, the method continues to step 428.

If the saturation of a pixel is more than the saturation threshold 604 in step 416, then hue and saturation analysis are performed in step 420. In step 420, the hue and saturation values of the pixels are analyzed, and the pixel is assigned to one of the bins in the hue/saturation plane based on these values.

As described above, FIG. 5A illustrates the hue/saturation plane, wherein hue is categorized by a color's angular orientation (from 0 to 360 degrees) on the cross sectional plane of FIG. 5A, and saturation is categorized as the color's $$BlkThreshold = \begin{cases} BlkGrayThreshold & \text{for } sat < 10 \\ (BlkGrayThreshold - 5)\exp[-0.025 \times (sat - 10)] + 5 & \text{for } 10 \leq sat \leq 200 \\ 5 & \text{for } 200 < sat \end{cases}$$

If a pixel's intensity is smaller than BlkThreshold, then in step 414 the pixel is immediately categorized as black. In this case, no further color learning is performed on the pixel. The threshold comparison performed in step 412 saves computer cycles by not requiring further HSI analysis on a pixel that is black based strictly on its low intensity. If the intensity value of the pixel is above the intensity threshold of step 412, then operations proceed to step 416, and further color categorizations are applied.

In step 416 the saturation value of the pixel is examined. If the saturation of a pixel is very low, different colors are not distinguishable and the pixel may immediately be categorized as either black, gray, or white. When a pixel's saturation is close to the minimum saturation level, the pixel may be graphically represented near the origin of the circle of FIGS. 5B. Step 416 determines if a pixel's saturation is lower than a selected saturation threshold 604 (FIG. 5B), i.e., is very close to 0. In one embodiment, the Saturation Threshold 604 has a default value of 10 on a scale from 0 to 255 (this corresponds to a default value of 0.04 on a scale from 0 to 1). If the saturation level of a pixel is below the saturation threshold, the pixel does not require further saturation analysis or the hue analysis of step 418 so the process advances to step 422.

Figure 15:
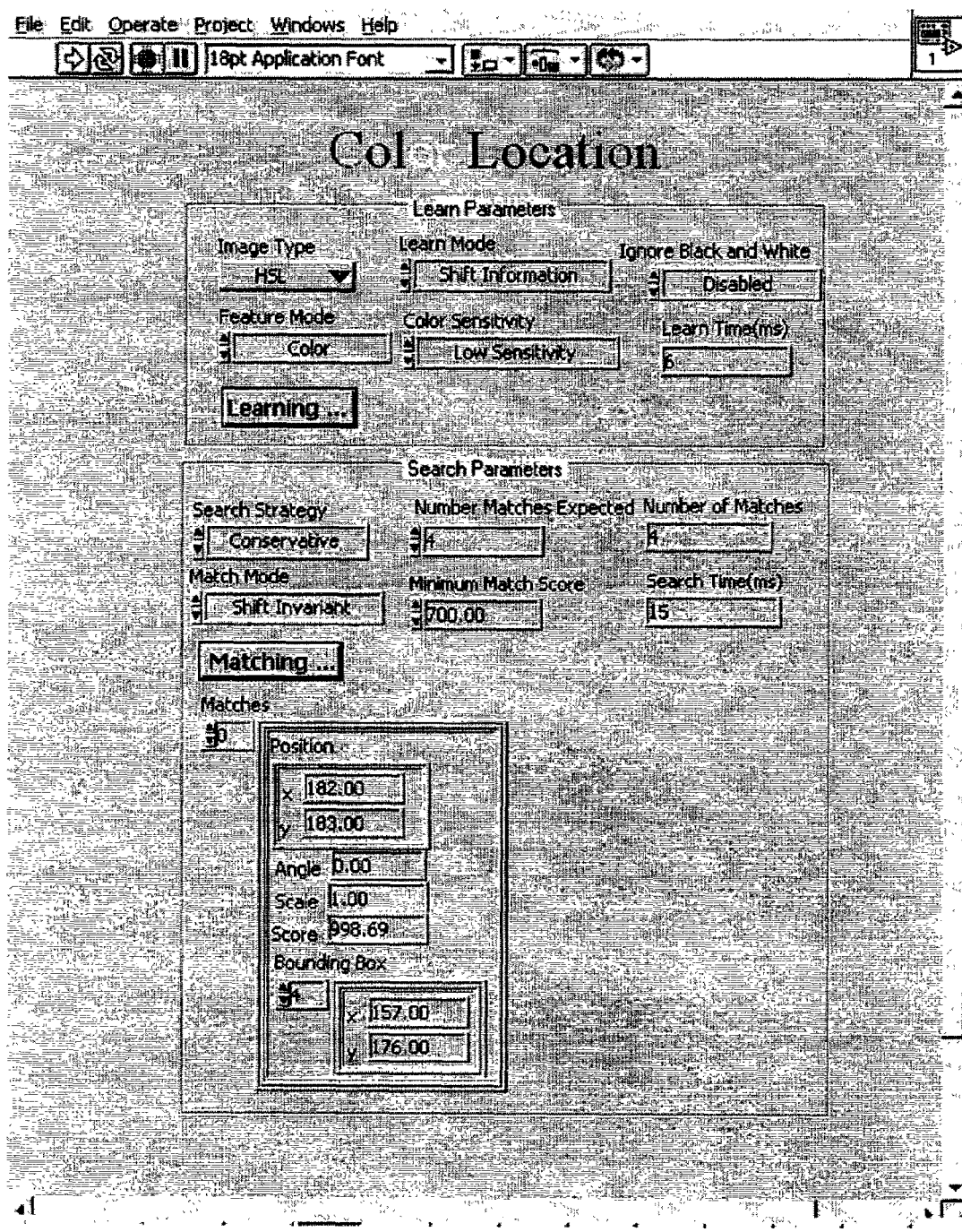
FIG. 15 illustrates an example of a graphical user interface (GUI) associated with color match location software according to one embodiment of the present invention.

In steps 422 and 423, a pixel (which has a very low saturation value) is examined based on its intensity value. A pixel that has very low saturation (i.e. is below the saturation threshold) is categorized as either black, gray, or white based radial distance on the cross sectional plane of FIG. 5A. Hue characterization may divide the hue plane into, for example, 7, 14, or 28 bins (for low, medium, or high complexity) depending on a selected color sensitivity, such as shown in FIG. 15, and the bins are further split in half by a radial distance value, represented by circle 442 (FIG. 5A), that allows categorization according to saturation within each hue bin. This doubles the total number of bins, or categories, in the hue/saturation plane to 14, 28, or 56, respectively.

If the current pixel being analyzed is the last pixel to be analyzed as determined in step 428, then operation completes. If not, then operation returns to step 412, and steps 412–428 are repeated. The color categorization process is repeated for at least a subset of the pixels, and possibly every pixel, until all are categorized. As each subsequent pixel is categorized, a running total of the number of pixels assigned to each bin may be stored in memory. Bins and the allocation of pixels to bins may be represented in any of various ways. In the preferred embodiment, the pixels are assigned to N categories or bins, where N=C*2+3 (where C=7, 14, or 28 depending on the selected complexity). The number N of bins or color categories may of course be adjusted by changing one or more of the number of hue divisions and saturation divisions.

After each pixel has been examined and assigned to one of the N categories, in step 430 the method may calculate color parameters, such as the percentage of pixels in each bin, i.e., the number of pixels in each bin in relation to the total number of pixels examined. These calculations will result in N percentages whose sum is equal to 100%. Percentages are used, rather than raw data, to allow matching of differently shaped, scaled and rotated images. It is noted that other types of color parameters may be generated, e.g., other types of normalized values which are independent of the number of pixels in the image object. The color characterization for the image thus may produce a list or data structure that contains N percentage values or parameters representing the color characterization of the image.

As noted above with reference to FIG. 6, in one embodiment, a user may specify one or more colors in the image to be ignored. In this case, the percentage of pixels in each bin corresponding to an ignored color may be set to zero, and the percentages for the remaining bins may be normalized to result in a total of 100%, or pixels corresponding to these bins may not be assigned to the bins at all, which would automatically result in a zero percentage for these bins.

Figure 8:
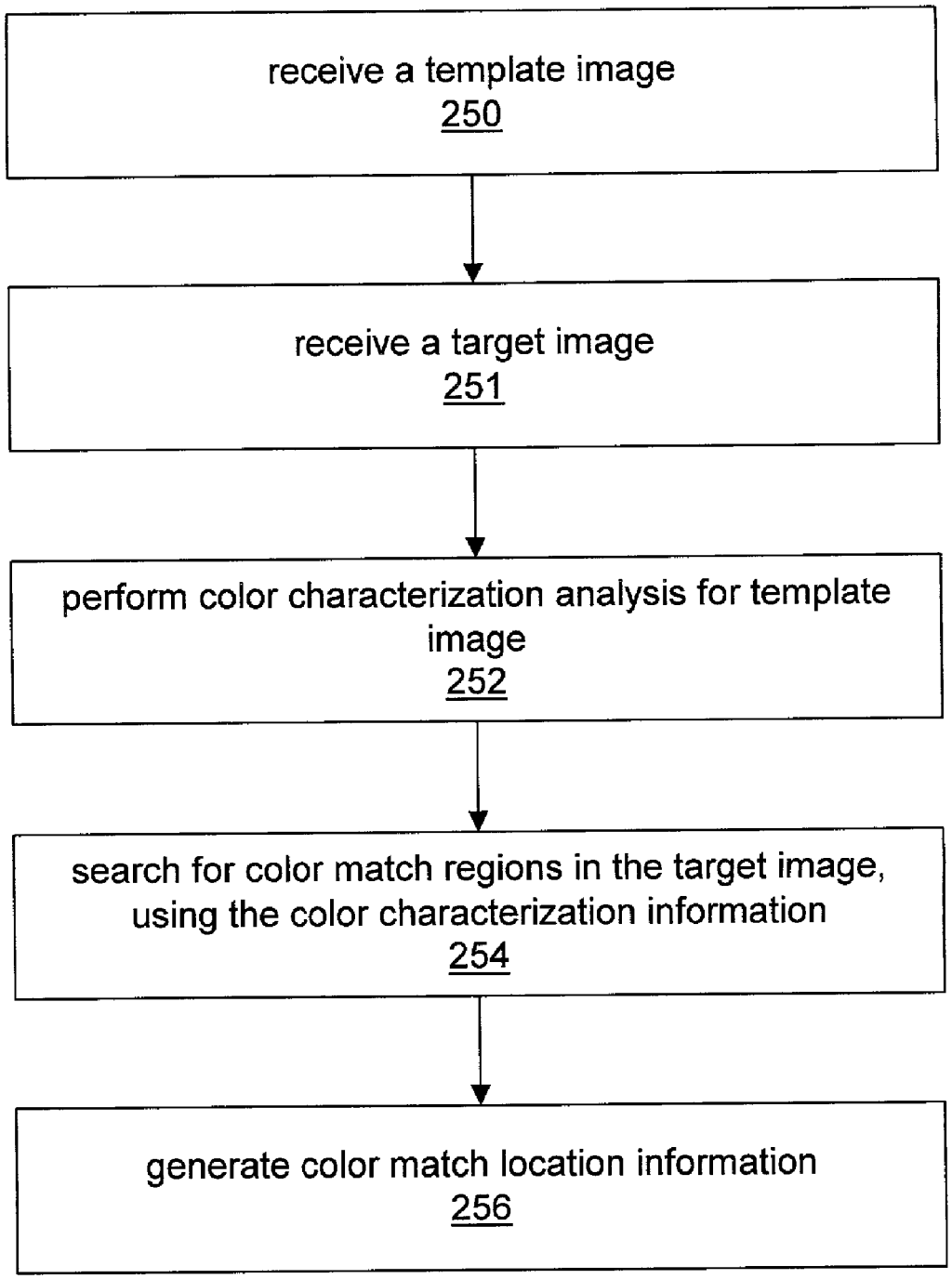
FIG. 8 is a flowchart diagram illustrating one embodiment of a method for locating regions of a target image that match a template image, with respect to color characterization.

FIG. 8—Color Match Location Method

FIG. 8 is a flowchart diagram illustrating one embodiment of a method for locating regions of a target image that match a template image, with respect to color characterization.

In step 250, a template image may be received. The template image may be an image of any of various types, including gray-level and color images. The template image may be received or obtained from any of various sources and may be an entire image or may be a portion of an image, e.g., a region of interest specified by a user. For example, a user may select a region of interest (ROI) using a graphical user interface (GUI). In one embodiment, a GUI may enable the user to choose from many different shapes of ROIs, such as a rectangle, an oval, or a shape selected freehand.

In step 251, a target image may be received. Similarly as for the template image, the target image may also be an image of any of various types, including an image obtained from a memory medium or an image acquired from a hardware device, such as a camera, frame grabber, scanner, etc. The target image may also be received from any other source, including from a graphics software program, from transmission via a network, etc. A target image may also be an entire image or only a portion of an image.

It is noted that in alternative embodiments, multiple template images and/or target images may be received or specified. For example, it may be desirable to search multiple target images for regions having color information matching that of a template image, or it may be desirable to search for target image regions matching any of a plurality of template images.

In step 252, a color characterization analysis may be performed for the template image. In one embodiment, this analysis may involve dividing the HSI color space into a number of categories or "bins". The color information of the template image pixels may then be examined in order to determine the allocation of the pixels across the bins. One particular embodiment of step 252 is described above with reference to FIG. 6. In alternative embodiments, any of various other methods may be used to perform the color characterization analysis.

In one embodiment, color characterization of the template image may be performed on a different computer system, and in step 250 the method may receive the color characterization information of the template image. Thus, the computer system executing the color match location software may only receive or store the color characterization information of the template image, and may not be required to store the template image itself.

In step 254, the target image may be searched in order to locate regions that match the template image with respect to color characterization. This search may utilize the color characterization information of the template image obtained in step 252 and may also involve performing color characterization analyses for various regions of the target image. Thus step 254 may involve performing color characterization analyses for various regions of the target image, and comparing this color characterization of each of these regions with the color characterization information of the template image obtained in step 252. Step 254 may be performed in any of various ways. In one embodiment the target image may be searched in multiple passes. The first pass may involve a coarse-grained search to efficiently identify a list of candidate areas or regions in the target image. Subsequent passes may then examine the candidate areas more closely in order to determine final matches. One specific embodiment of step 254 is discussed in detail below with respect to FIG. 9.

In step 256, color match location or analysis information may be generated. Step 256 may involve displaying information, such as visually indicating the location of the match regions within the target image, and/or displaying information indicating various statistics regarding the color information of the match regions or regarding how closely the regions match the color information of the template image.

Figure 9:
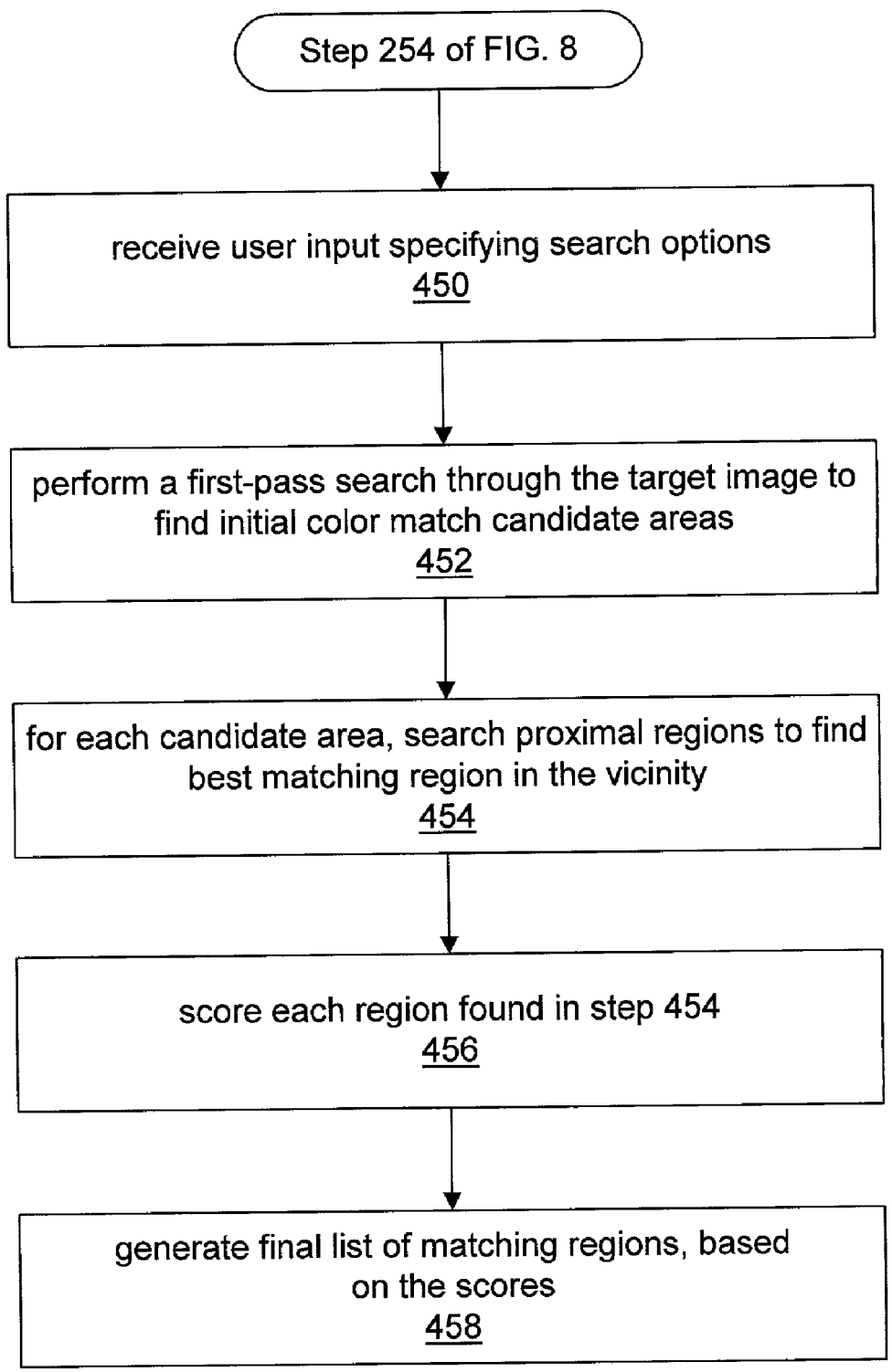
FIG. 9 is a flowchart diagram illustrating one embodiment of a method for searching a target image to find regions having color information that match a template image.

FIG. 9—Target Image Search

FIG. 9 is a flowchart diagram illustrating one embodiment of a method for searching a target image to find regions having color information that match a template image. In one embodiment, the target image search method shown in FIG. 9 may be used in step 254 of the color match location method shown in FIG. 6. In alternative embodiments, any of various other search methods may be used, as desired for a particular application. The target image search method shown in FIG. 9 utilizes a coarse-to-fine heuristic, in which candidate color match areas of the target image are identified in a first-pass search, and these candidate areas are then examined in more detail to identify final color match regions.

Each region of the target image that is examined may be regarded as a window into the target image. This window may have various sizes. For example, the window size may correspond exactly to the size of the template image, or the window size may be scaled to be larger or smaller than the template size. The window may be moved through the target image in order to sample the image at various regions. The points at which to sample regions may be determined in any of various ways. In one embodiment, the window may initially be positioned at the top, left corner of the target image and may then be moved through the image at interval steps. For each sample region, the color information of the region may be compared with the color information of the template image, as described below.

FIG. 10 illustrates an example of window movement during a first-pass search, in which the window begins at the top, left corner of the target image and is moved through the target image using a step size of nine pixels. After an initial color comparison between the template image and the top, left portion of the target image has been performed in FIG. 10A, the window, for example, is moved downward 9 pixel scan lines as shown in FIG. 10B. After this portion of the target image is compared to the template image, the window is moved another 9 scan lines downward as shown in FIG. 10C. The comparisons are repeated until the window reaches the bottom left portion of the target image, as shown in FIG.

Figure 10A:
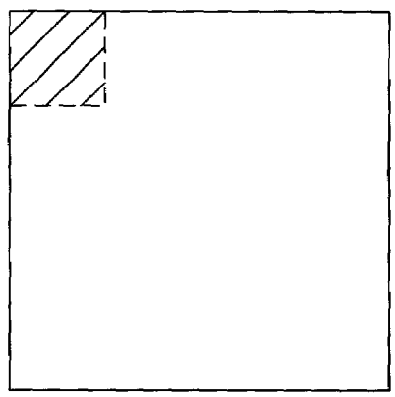
FIG. 10 illustrates an example of target image window movement during a first-pass search.
Figure 10B:
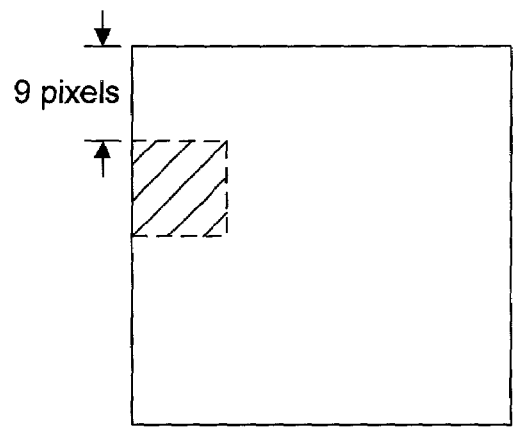
Figure 10C:
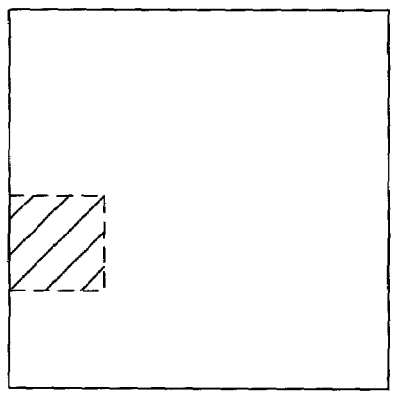
Figure 10D:
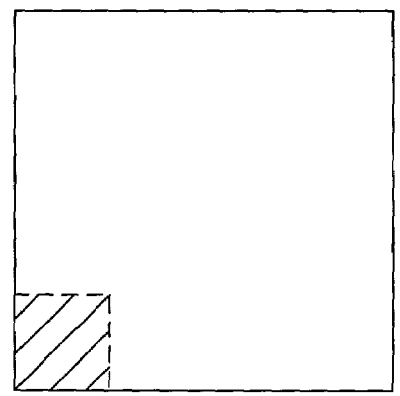
Figure 10E:
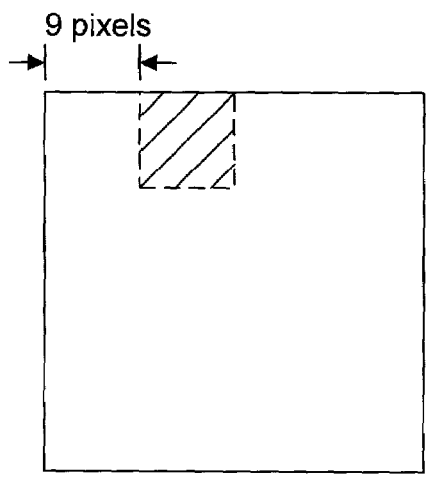
Figure 10F:
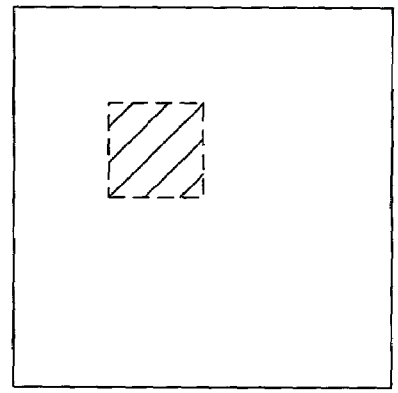

10D. After this comparison, the window, for example, is moved back to the top of the target image and is moved over 9 vertical pixel columns to perform another comparison, as shown in FIG. 10E. After this comparison is performed in FIG. 10E, the window is moved down 9 horizontal scan lines of pixels as shown in FIG. 10F. This procedure again repeats a plurality of times until the window again reaches the bottom of the target image. At this point, the window is moved back to the top of the target image and across 9 more vertical column of pixels (not shown) to perform another set of comparisons. This procedure may be performed until the window has been stepped through the entire target image, using a 9 pixel step size.

It is noted that FIGS. 10A–10F are merely an example of stepping the window across the target image, it being noted that the window may be stepped across the target image using any of various step sizes and in any of various manners, e.g., left to right, right to left, top to bottom, bottom to top, or other methodologies. Also, the target image may not necessarily be sampled at regular step intervals. For example, window placement may be chosen using any of various algorithms, or may be chosen randomly, quasi-randomly, etc.

In step 450 of FIG. 9, user input specifying various search options may be received. For example, the search options may specify various parameter values affecting the degree of granularity used for deciding color matches and/or the efficiency of the target image search process. In one embodiment, the user may specify one of three options: "conservative", "balanced," or "aggressive," which each control various search parameters, such as described below with reference to FIG. 11. In other embodiments search parameters may be specified individually.

In step 452, a first-pass search through the target image may be performed in order to find initial color match candidate areas, i.e., areas that may contain a region having color information that matches the color information of the template image. One embodiment of 452 is described below with reference to FIG. 11.

In step 454, each candidate area identified in step 452 may be examined in more detail. In the first-pass search, various regions of the target image may be sampled at a relatively large step size, in order to efficiently identify areas containing a possible match. In step 454, for each candidate area, the search window may initially be placed at the position where the window was during the first-pass search when the candidate area was identified. The window may then be moved around this initial position at a reduced step size in order to perform a finer-grained search, so that the best matching region for each candidate area is determined. The new step size may be inversely proportional to how well the initial candidate matched the template image. In other words, a "hill-climbing" heuristic may be used, such that if the initial candidate is very close to the template image, smaller steps are taken so that the best match is not stepped over. Various methods for determining how close the color information of a target image region is to the color information of the template image are discussed below.

During the search performed in step 454, the window may be moved around each candidate area using any of various strategies or algorithms. However, the distance that the window may be moved away from the original candidate's position is preferably limited, e.g., as a function of the size of the window and/or the step size used in the first-pass search. In one embodiment, if it is determined that the degree to which the target image color information matches the template image color information is decreasing as the window moves away from its initial position, then searching in that direction may be aborted, in order to avoid unnecessary comparisons.

As discussed above with reference to FIG. 8, when the color information for a target image region is analyzed, it may be desirable to examine the color information for only a subset of the individual pixels of the region, e.g., in order to search through the target image more quickly. The sub-sampling size for each target image region may be determined by search criteria specified by the user. In step 454, it may be desirable to increase the sub-sampling size used in analyzing the color information for the target image over the sub-sampling size used in the first-pass search, in order to possibly obtain more accurate color characterization information.

In various embodiments, step 454 may comprise performing one or more subsequent passes through the candidate list after the first pass. For example, if desired, the coarse-to-fine search heuristic may be repeated, possibly only for certain candidates, using successively smaller step sizes, and/or larger sub-sampling sizes, e.g., until the step size is reduced to one pixel and every pixel of the target image region is sampled. The desired number of passes performed and the rate at which the search parameters change between passes may differ according to the accuracy and efficiency requirements of particular applications.

Each initial candidate area identified in the first-pass search may be replaced by the region found in step 454 having color information that best matches the color information of the template image (or may not be replaced if no better match is found). Also, it is possible that candidate areas identified during a previous pass are eliminated altogether in a subsequent pass. For example, since the step size may be relatively large during the first-pass search, the match criteria for identifying candidates may be relatively loose, i.e., a target image region may not need to match the template image very closely in order to be considered a candidate match area. As candidate regions are examined more thoroughly in subsequent passes, it may be desirable to require the color information of each candidate to match the template image more strongly in order to remain a candidate.

In one embodiment, information regarding an expected number of matches to be found in the target image may be utilized in order to more quickly complete the color match location process. For example, FIG. 15 illustrates a graphical user interface enabling a user to specify an expected number of matches. In this case, the method may limit the number of color match candidate regions that are searched to a maximum number based on the expected number of matches. In one embodiment, this maximum number may be calculated with a formula such as:

$$Max = Base + Factor * NumberExpected$$

where "Base" and "Factor" are configurable variables.

The list of candidate regions identified in the first-pass search through the target image may be sorted with respect to how well the color information of each candidate region matches the color information of the template image, and in a subsequent search pass, the list of candidate regions may be traversed in this sorted order. The maximum number calculated based on the number of expected matches may be used to limit the number of candidate regions that are searched in a subsequent pass. Since the first-pass search may use relatively loose matching criteria, the first-pass search may identify a large number of candidate regions. The method may operate to keep track of the number of candidates remaining after a subsequent pass. If the maximum number is reached, then a traversal of the remaining first-pass candidate regions may be avoided. In one embodiment, however, if the color difference between a given candidate region and the template image is smaller than a certain threshold value, then that candidate region may be traversed regardless of whether or not a maximum number of subsequent-pass candidates has already been reached.

In step 456 each of the candidate regions determined after the one or more passes performed in step 454 may be scored, based on the difference between their color characterization information and the color characterization information for the template image. The color differences may be calculated in any of various ways. Particular embodiments of color difference methods are discussed below. Any of various systems may be used to score the candidate regions. In one embodiment, each region is assigned a score from 0 to 1000, with 1000 being the best possible match and 0 being the worst.

In step 458 a final list of color match regions may be generated, based on the scores determined in step 456. For example, the scores may be compared to a threshold value that is used to eliminate regions scoring below a certain level. This threshold value may be a default value or may be specified from the user input received in step 450.

Figure 11:
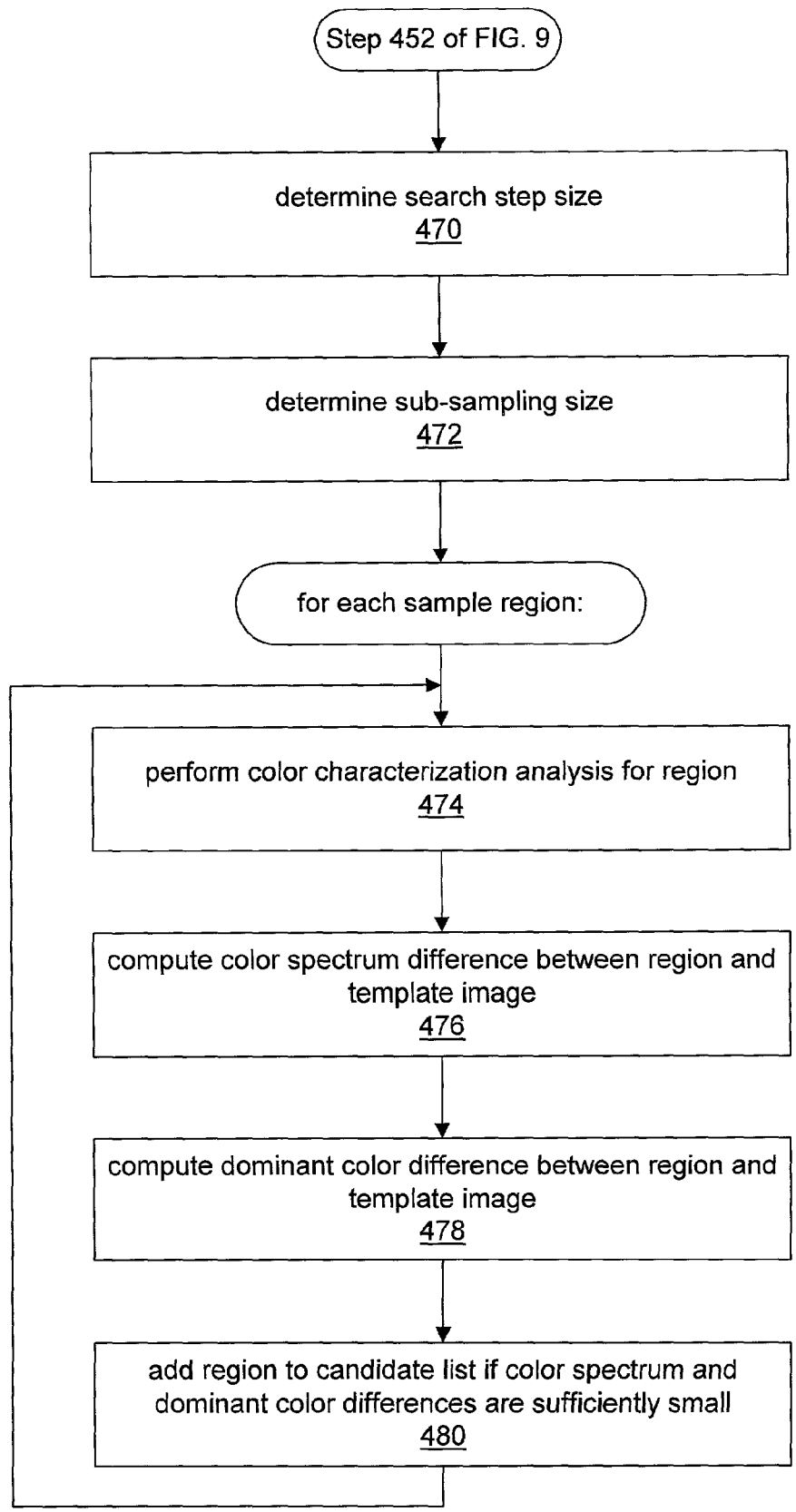
FIG. 11 is a flowchart diagram illustrating one embodiment of a method for performing a first pass search through a target image.

FIG. 11—First-Pass Search

FIG. 11 is a flowchart diagram illustrating one embodiment of a method to perform the first pass search illustrated in step 452 of FIG. 9. As discussed above, in one embodiment, the first-pass search may involve sampling various regions of the target image, where the regions that are sampled may be determined by a window that slides along the target image according to a particular step size. Thus, in step 470 the method may determine an appropriate step size to use in sliding the window. The step size may at least in part be determined based on user input received in step 450 of FIG. 9. For example, if the user specified aggressive search criteria, then the step size may be relatively large, whereas the step size may be relatively small if the user specified conservative search criteria. In various embodiments, the search size may also depend on the size of the template image and/or the target image.

For each region that is sampled, the color information for the region may be analyzed, similarly as for the template image. However, as described above, it may not be desirable to examine the color information of every pixel in the region. Thus, in step 472, a sub-sampling size and/or method may be determined, wherein the sub-sampling size specifies the number of pixels to examine for each region. The sub-sampling method may specify the type of sub-sampling, such as random, pseudo-random, or a low discrepancy sequence. In one embodiment, the method may use a low discrepancy sequence to select the subset of pixels. Similarly as for the step size, the sub-sampling size and/or method may depend on search criteria specified by the user.

As shown in FIG. 11, steps 474 through 480 may then be performed for each region of the target image to be sampled.

In step 474, a color characterization analysis for the target image region may be performed. This step may utilize the color characterization method described above with reference to FIG. 7, in which the target image pixels (or a selected subset of pixels) are examined individually with respect to their color information and assigned to color space bins. In step 476, a measure of difference (or similarity) between the color spectrum of the target image region and the color spectrum of the template image may be computed by comparing the information obtained in their respective color characterization analyses. This comparison may be performed in any of various ways. In one embodiment, for each color bin from a set of N bins, the pixel percentage values assigned to corresponding bins for the two images may be subtracted from one another, resulting in N difference values. The closer each of the difference values is to zero, the more similarity there is between the template image and the target image region, with respect to that color category; i.e., the percentage of pixels on the template image and the target image region that fall into that particular color category are substantially the same.

The absolute values of the difference values may then be summed to give a value falling between zero and two, where two represents a maximum measure of difference between the color spectrums and zero represents a maximum measure of similarity. Alternatively, each of the difference values may be compared to a threshold value to determine a "score" for each color category.

While the above method is simple to apply and the results are easily understood, this method may not be the best method for all color matching applications. For example, consider a case where at least one of the seven natural colors of the hue plane is divided into two or more bins, e.g., in response to a user specifying a medium or high sensitivity level. Even if the template image and the target image region have colors that are very similar, it is still possible that pixels from each will be assigned to different bins corresponding to the same natural color in the hue plane. Thus, the results from this example may show very few or no pixels in the same bin, i.e., the results would indicate that the template image and the target image region have very different color spectrums. This may not be the proper result because the colors in the template image and the target image region are actually very similar, but happen to be in different hue categories of the same natural color.

Alternative color spectrum techniques may compensate for cases such as described above. In various embodiments, a portion of the percentages of pixels assigned to each bin may be manipulated, in order to share pixels among or re-distribute pixels to neighboring bins, before calculating the measure of color spectrum difference as described above.

Figure 12:
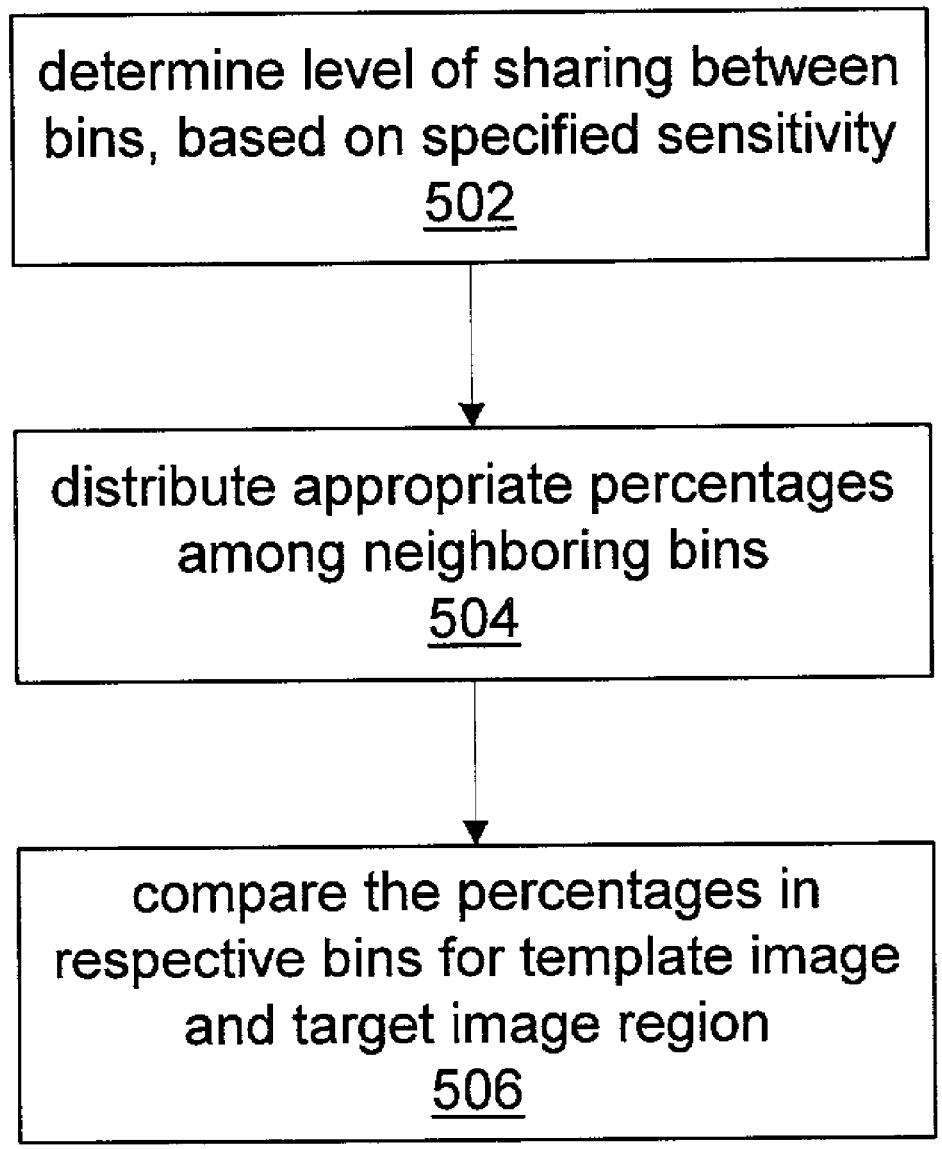
FIG. 12 is a flowchart diagram illustrating one embodiment of a method for performing pixel sharing or re-distribution after pixels have been assigned to HSI color bins.

FIG. 12 is a flowchart diagram illustrating one embodiment of a method for performing this type of pixel sharing or re-distribution. As shown, in step 502 the level of sharing or distribution may be determined according to a color sensitivity level specified by the user. In one embodiment, each bin shares with zero bins, one neighboring bin on each side, or two neighboring bins on each side, depending on a specified sensitivity level of low, medium, or high, respectively. In another embodiment, the level of sharing or distribution with neighboring bins may be determined automatically by the computer, e.g., if a certain threshold of pixels of the template image and the target image region fall into respective neighboring bins (as in the example above), then the method may automatically apply a level of sharing or distribution. Thus, the method may automatically detect and compensate for the types of errors described above.

In step 504, the pixel allocation percentages may be re-distributed among neighboring bins. Step 504 may be performed in any of various ways. For example, in one embodiment, a respective bin that contains 40% of all pixels may share 10% of its total with the neighboring bins on either side. In other words, 4% (10% of 40%) may be added to the neighboring bins on either side of the respective bin. This would leave 32% in the respective bin (40%–4%–4%=32%). The neighboring bins may then undergo the same sharing process, and a certain percent may be shifted back as well as a certain percent being shifted to another neighboring bin, and so on. Any of various other methods may be used in re-distributing the pixel percentages. These types of adjustments may have an effect similar to adding additional bins, making the results smoother. Hence, these types of adjustments may be referred to as "smoothing operations". A smoothing operation may be performed for both the template image and the target image region.

In step 506 the compensated percentages of the template image and target image region may then be compared. For example, step 506 may involve subtracting percentages in respective bins of the template image and target image region and summing the results, similarly as described above. This may produce a value representing a measure of difference between the color information of the template image and the color information of the target image region.

It may sometimes be desirable to distribute pixels among multiple bins, based not only on bin percentages, but also on where the pixels fall in the bins, in terms of the portions of color space represented by the bins. For example, as described above with reference to FIG. 7, pixels may be assigned to multiple bins at the time when the color characterization analysis is performed, e.g., on a fractional weighted basis. This increased complexity may result in more accurate color match location results.

Figure 14:
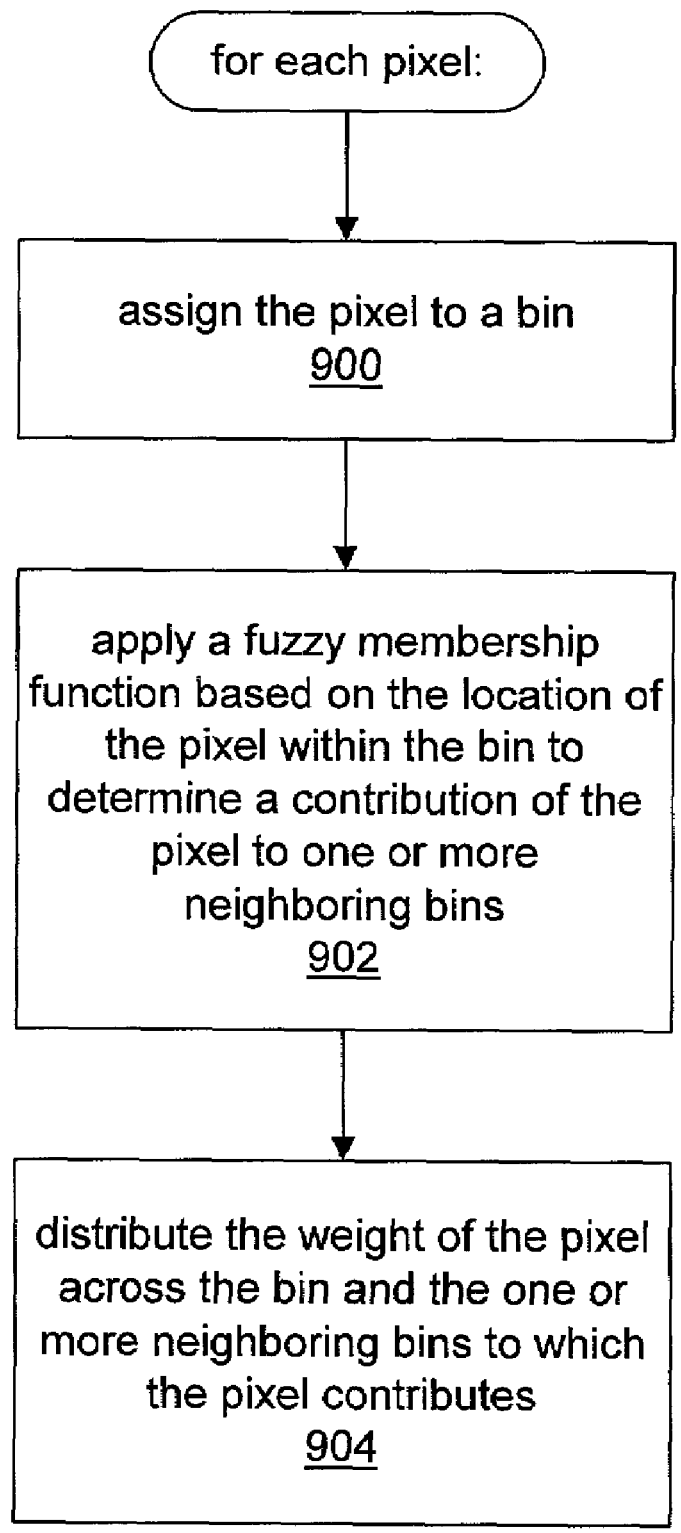
FIG. 14 is a flowchart diagram illustrating one embodiment of a method of using a fuzzy membership function to characterize the color information of the image.

Various embodiments may employ fuzzy membership or other functions to determine the desired distribution among multiple bins. FIG. 14 is a flowchart diagram illustrating one embodiment of a method using fuzzy membership functions to characterize the color information of the image. The steps shown in FIG. 14 may be performed for each pixel (possibly of a subset) of the image (or region of the image being examined).

As shown, in step 900, the pixel may be assigned to a bin. For example, as described above, step 900 may comprise examining color information of the pixel to determine where the pixel lies within the color space and assigning the pixel to a bin corresponding to that portion of the color space.

In step 902, a fuzzy membership or other function may be applied, based on where the pixel falls within the bin. As described above, the bin corresponds to a portion of the color space, and the color information of the pixel may correspond to a point within the color space. Thus, the pixel may fall within the bin at various locations, with respect to the range of color space values corresponding to the bin.

The fuzzy membership function may determine a contribution which the pixel should make to one or more neighboring bins. For example, if the pixel falls near the edge of a bin (with respect to the portion of the color space that the bin corresponds to), then the fuzzy membership function may determine that a portion of the weight of the pixel should be contributed to the neighboring bin which the pixel is near. Any of various types of fuzzy membership functions may be applied, and the function may determine a contribution which the pixel should make to any number of bins, wherein the sum of these contributions is 100%. For example, the function may determine a plurality of values summing to 1.0, such as, 0.25, 0.50, and 0.25, wherein each value corresponds to a bin.

In step 904, the weight of the pixel may be distributed across the bin to which the pixel was originally assigned and across the one or more bins to which the pixel contributes, in accordance with the contribution values determined in step 902. For example, values determined by the function in step 902, such as the above exemplary values of 0.25, 0.50, and 0.25, may each be assigned to a corresponding bin.

It is noted that FIG. 14 is exemplary, and various alternative embodiments are contemplated, e.g., in which various steps may be combined, omitted, reordered, altered, For example, step 900 may not need to be performed. For example, the function may determine a plurality of values to assign to a plurality of color space bins, based on the color information of the pixel and the location of the pixel within the color space, and not necessarily based on the location of a pixel within a bin.

Figure 13A:
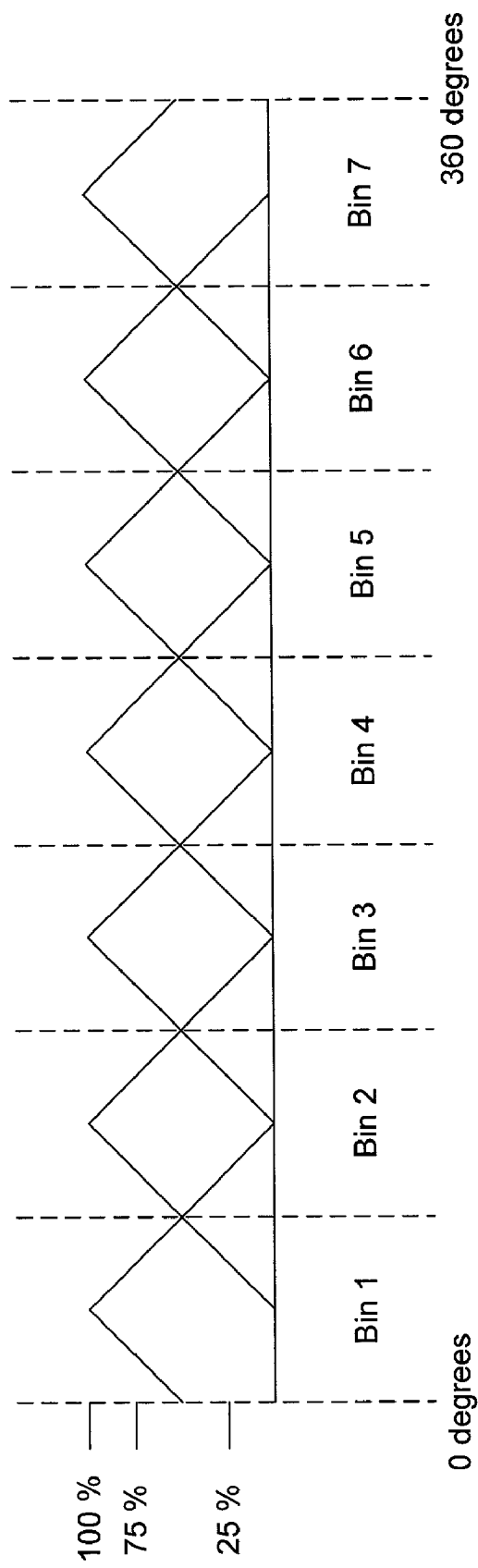
FIGS. 13A, 13B, and 13C illustrate examples using fuzzy membership functions to determine a desired fractional pixel distribution among HSI color bins.
Figure 13B:
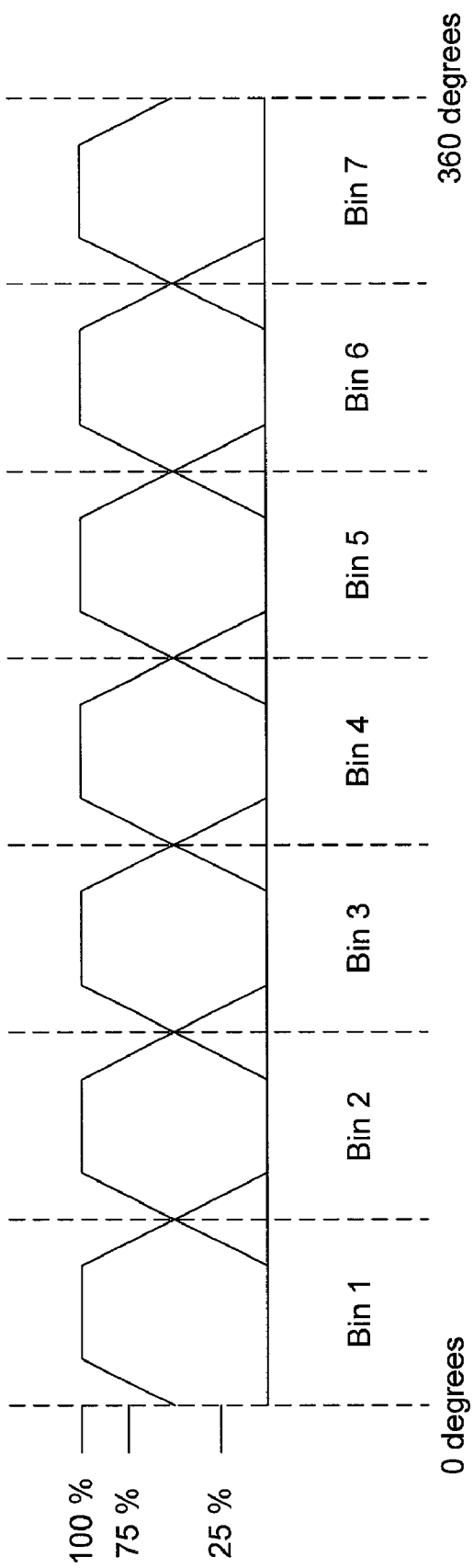
Figure 13C:
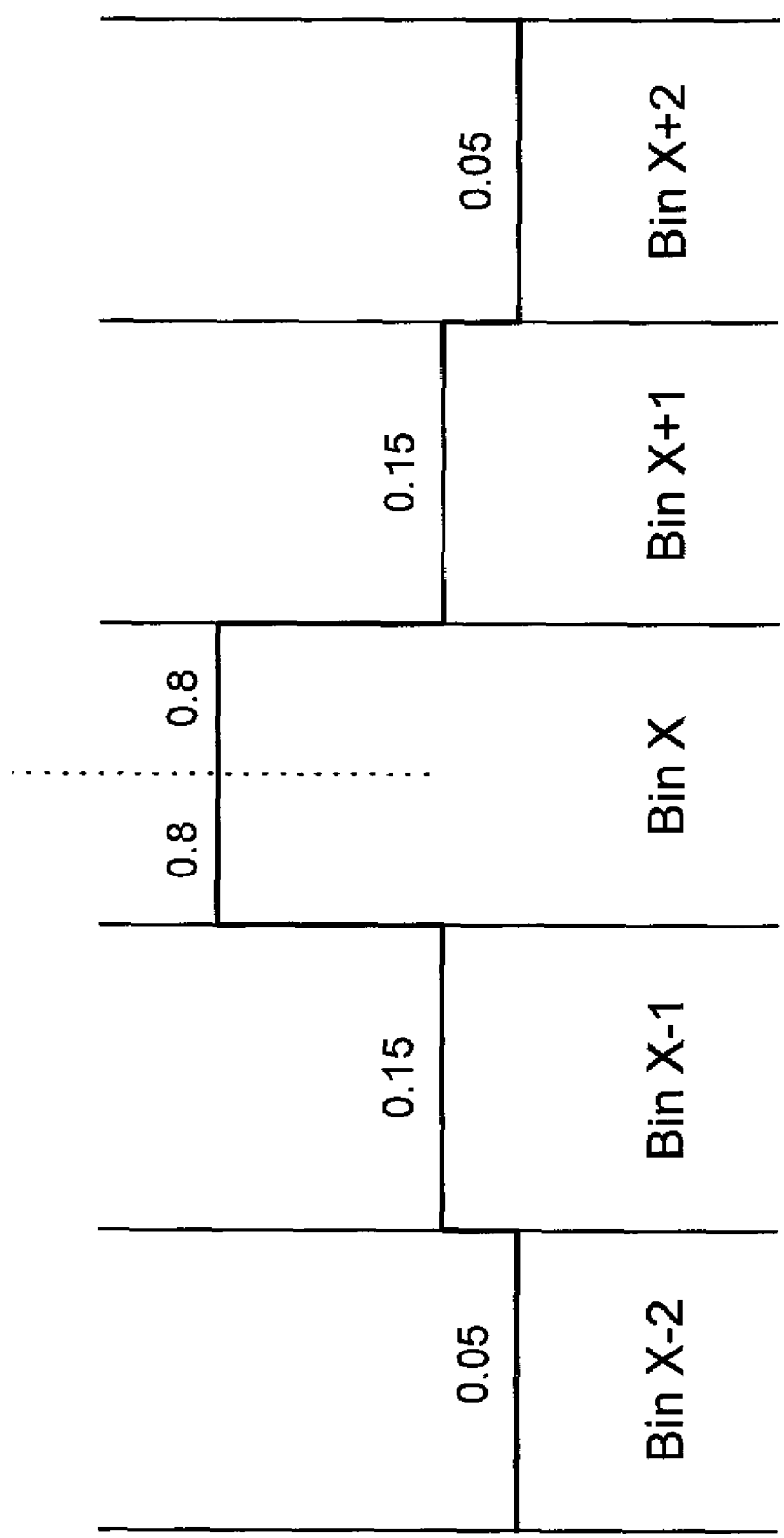

FIGS. 13A, 13B, and 13C illustrate examples of how fuzzy membership functions may be utilized. FIG. 13A illustrates a triangle fuzzy membership function. In FIG. 13A, the 360-degree hue plane is divided into seven bins, which are shown linearly. For each pixel, the bin that the pixel falls into may be determined, as well as the position within this bin. The triangle fuzzy membership function may then be applied, based on the position within the bin, in order to determine a percentage of the pixel weight which should be assigned to that bin and or to a neighboring bin. This is represented by the angular lines drawn over the bins. In this example, if a pixel falls exactly within the center of a bin, then, as shown, 100% of the pixel weight is assigned to that bin. If a pixel falls one fourth away from the edge of the bin, then 75% of the pixel weight is assigned to that bin, and 25% of the pixel weight is assigned to the neighboring bin next to that edge, as indicated by the dashed lines.

FIG. 13 B illustrates a trapezoidal fuzzy membership function. In this example, if the pixel falls near the center of a bin, then 100% of the pixel weight is assigned to that bin. Otherwise, a portion of the pixel weight may be distributed to a neighboring bin, similarly as in FIG. 13A.

FIG. 13C illustrates another example of distributing a pixel among multiple bins. In the example of FIG. 13C, a step fuzzy membership function as applied.

Consider the bin labeled "Bin X." If the pixel falls to the left of the center line shown, i.e., in terms of the pixel's hue, then Bin X is assigned 80% of the pixel weight, Bin X-1 is assigned 15% of the weight, and Bin X-2 is assigned 5% of the pixel weight. Thus, in this example, pixels may be distributed across three bins. Increasing the number of bins over which a pixel is distributed may be especially desirable when the hue space is partitioned into a large number of bins. It is noted that the fuzzy membership functions shown in FIGS. 13A, 13B, and 13C are exemplary, and any other technique may be used in determining an appropriate pixel distribution.

As noted above, in one embodiment, information indicating one or more dominant color categories may be obtained when performing a color characterization analysis of a template image. Referring again to FIG. 11, in step 478, a measure of difference for the dominant color categories may be computed. This measure of difference may be computed similarly as described above for the color spectrum difference. For example, for each dominant color category determined for the template image, the percentage of template image pixels assigned to the dominant color category may be compared to the percentage of target image region pixels assigned to that color category.

In step 480, the difference values determined in steps 476 and 478 may be used to decide whether to add the region to a list of candidate match areas. For example, the color spectrum difference may need to be less than a threshold value in order for the region to be added to the list. It is noted that the color spectrum difference may be tested immediately after its calculation, and further analysis of the sample region, such as step 478, may be aborted if the difference is too great.

If the color spectrum difference is sufficiently small, then the dominant color difference(s) may be considered. Considering the dominant color difference(s) may help to further ensure that the sample region area is a potential match, since in various embodiments of the calculation of the color spectrum difference, it is possible to obtain a small difference value, even though the occurrence of the dominant color(s) of the template image may be largely reduced in the sample region or may even be missing altogether in the sample region. Dominant color differences may be considered individually or together. For example, if there are multiple dominant color categories, then the percentage difference for each category may be required to be smaller than a threshold value in order for the region to be added to the candidate list, or the average of the differences for all the categories may be required to be smaller than a threshold value.

FIG. 15—Color Match Location User Interface

FIG. 15 illustrates an example of a graphical user interface (GUI) associated with color match location software according to one embodiment of the present invention. A brief description of applicable GUI elements is given below. It is noted that various other embodiments of such a GUI may comprise GUI elements enabling the user to specify variables affecting the color match location operation at a broader or finer level of granularity than the GUI shown in FIG. 15.

The GUI of FIG. 15 is associated with an application that is operable to perform match location of regions in a target image based on both color information of a template image and shape or pattern information of the template image. Thus, certain GUI elements pertain to this shape or pattern information.

"Image Type" displays the color format of the current target image. Color formats may include RGB, CMY, or HSI, among others.

"Learn Mode" specifies the invariant features to learn when setting up a learn color pattern. The following values may be selected: "All" (extracts template information for shift and rotation invariant matching"; "Shift Information" (Default) (extracts information for shift invariant matching); "Rotation Information" (extracts information for rotation invariant matching).

"Ignore Black and White" enables the user to specify that pixels classified as black and/or white are ignored in the match location operation.

"Feature Mode" specifies the features to use in the searching stage. The following values may be chosen: "Color" (use color features only in the searching stage); "Shape" (use shape features in the searching stage); and "Color and Shape" (Default) (use both color and shape features in the searching stage.

"Color Sensitivity" specifies a level of color sensitivity ("low", "medium", or "high"). This setting may affect the number of color category divisions to use.

"Search Strategy" specifies the different searching algorithms to achieve a tradeoff between search speed and accuracy. The default option is "Balanced". In case the speed does not meet requirements, the "Aggressive" option may be used. In case the accuracy does not meet requirements, the "Conservative" option may be used.

"Number of Matches Expected" specifies a number of matching regions the user expects the target image to have, which may be used to increase the efficiency of the color match location process, as described above.

"Match Mode" specifies the technique to use when looking for the template pattern in the image. The following values may be chosen: "Shift Invariant" (default) (searches for the template pattern in the image, assuming that it is not rotated more than ±4°); "Rotation Invariant" (searches for the template in the image with no restriction on the rotation of the template). If the "Feature Mode" is set to "Color" only, then the rotation Invariant matching can also be achieved by using a square template image in "Shift Invariant" mode.

"Minimum match score" specifies a threshold value for color matching scores. The data range is between 0 and 1000.

As shown, the GUI also includes various fields for viewing information for each matching region of the target image, once the search has been performed, such as the location and size of the region, a match score indicating how close the color information of the region matches the color information of the template image, etc.

Figure 16:
FIG. 16 illustrates a target image in which color match locations are visually indicated.

FIG. 16—Displaying Color Match Regions

In addition to displaying various statistics regarding each match region found, as shown in FIG. 15, the locations of the match regions may also be visually indicated in the target image, e.g., by displaying a box around each match region, as shown in FIG. 16.

Figure 17:
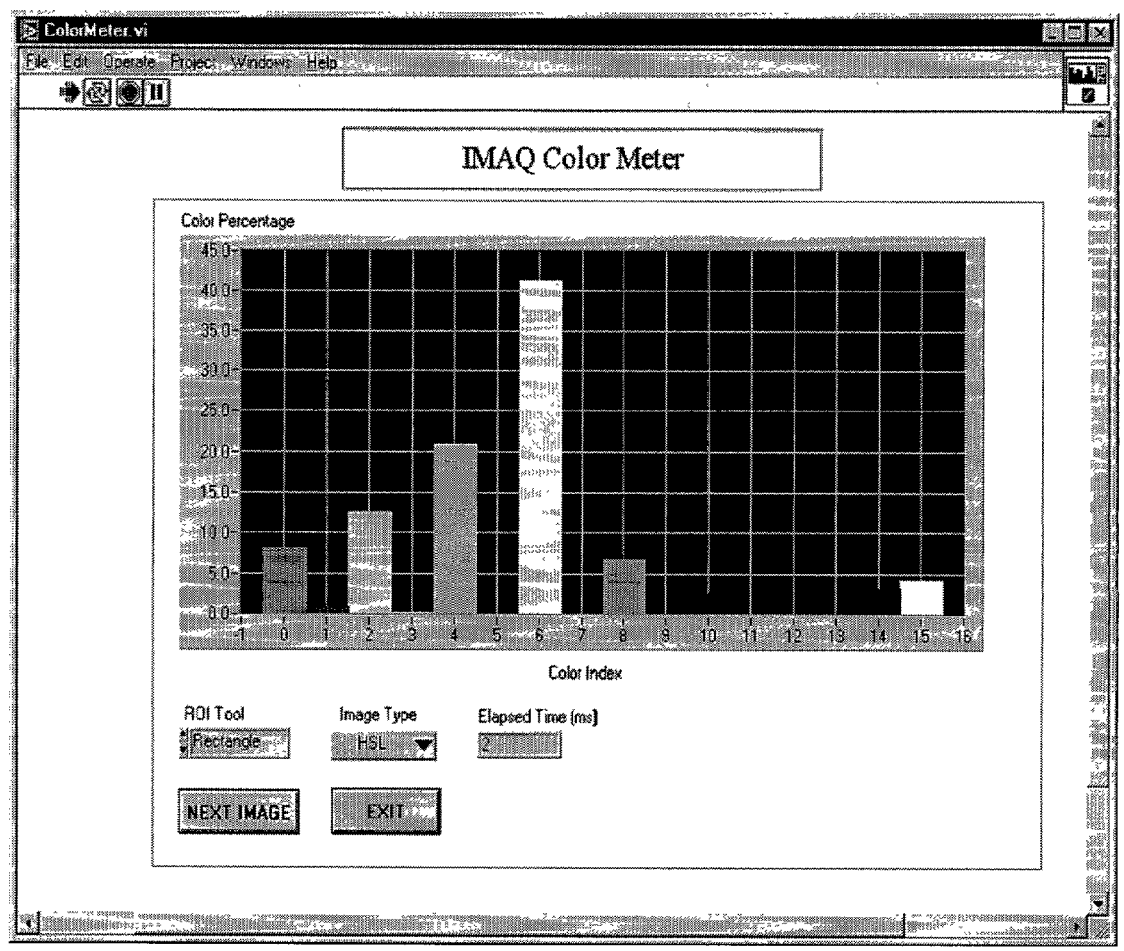
FIG. 17 illustrates a display of information representing the color characterization of an image.

FIG. 17—Display Color Characterization Information

In one embodiment, an application may be operable to display information representing the color characterization of an image. FIG. 17 illustrates one example of such a display. FIG. 17 shows the percentage (vertical scale) of 16 defined colors (horizontal scale) as determined by one embodiment of the color characterization method described herein.

The color characterization list or data structure may further be operated upon to create a color characterization represented as a single value. The color characterization may also be represented textually (e.g., by the terms brick red, jet black, mauve, etc.) through the use of a look-up table configured according to the color categorization method of the present invention. The color characterization may also be represented graphically in various ways. The color characterization may be stored along with the image or transmitted to other computer systems for analysis or display. The color characterization may also be used as part of an image compression technique.

Although the embodiments above have been described in considerable detail, numerous variations and modifications will become apparent to those skilled in the art once the above disclosure is fully appreciated. It is intended that the following claims be interpreted to embrace all such variations and modifications.

The invention claimed is:

1. A computer-implemented method for characterizing colors of an image, wherein the image comprises a plurality of pixels, the method comprising:

for each respective pixel of at least a subset of pixels of the image, assigning values to one or more color categories based on color information of the pixel;

wherein, for each of one or more first pixels, said assigning comprises assigning values to a plurality of the color categories based on color information of the pixel, wherein, for each of the one or more first pixels, said assigning comprises assigning a percentage of the pixel to each of the plurality of color categories; and determining information regarding the total values of pixels assigned to each of the color categories, wherein said information characterizes colors of the image.

2. The method of claim 1,
wherein, for each of the one or more first pixels, the sum of the percentages assigned to each of the plurality of color categories is 100 percent.

3. The method of claim 1,
wherein each of the one or more color categories corresponds to a portion of a color space.

4. The method of claim 3,
wherein, for each respective pixel of the at least a subset of pixels, said assigning values to the one or more color categories based on color information of the pixel comprises:
determining a location of the pixel within the color space;
applying a function based on the location of the pixel within the color space to determine the values assigned to the one or more color categories.

5. The method of claim 4,
wherein said determining the location of the pixel within the color space comprises examining color information of the pixel.

6. The method of claim 5,
wherein the color space is the Hue, Saturation, Intensity (HSI) color space;
wherein said examining color information of the pixel comprises examining HSI information of the pixel.

7. The method of claim 4,
wherein the function is a fuzzy membership function.

8. The method of claim 7,
wherein the fuzzy membership function is one of:
a triangle fuzzy membership function;
a trapezoidal fuzzy membership function; and
a step fuzzy membership function.

9. The method of claim 1,
wherein said assigning values to one or more color categories based on color information of each pixel comprises creating a data structure having values representing the total values of pixels assigned to each of the color categories;
wherein said determining information regarding the total contributions of pixels to each of the color categories comprises determining the values of the data structure.

10. A computer-implemented method for characterizing colors of an image, wherein the image comprises a plurality of pixels, the method composing:
for each respective pixel of at least a subset of pixels of the image, determining contributions of the pixel to one or more color categories;
wherein, for each of one or more first pixels, said determining comprises determining contributions of the pixel to a plurality of the color categories, wherein, for each of the one or more first pixels, said determining comprises determining a percentage of the pixel that is contributed to each of the plurality of color categories; and
determining information regarding the total contributions of pixels to each of the color categories, wherein said information characterizes colors of the image.

11. The method of claim 10,
wherein, for each of the one or more first pixels, said determining comprises determining a percentage of the pixel that is contributed to each of the plurality of color categories.

12. The method of claim 11,
wherein, for each of the one or more first pixels, the sum of the percentages contributed to each of the plurality of color categories is 100 percent.

13. The method of claim 10,
wherein each of the one or more color categories corresponds to a portion of a color space.

14. The method of claim 13,
wherein, for each respective pixel of the at least a subset of pixels, said determining the contributions of the pixel to the one or more color categories comprises:
determining a location of the pixel within the color space;
applying a function based on the location of the pixel within the color space to determine the contributions of the pixel to the one or more color categories.

15. The method of claim 14,
wherein said determining the location of the pixel within the color space comprises examining color information of the pixel.

16. The method of claim 15,
wherein the color space is the Hue, Saturation, Intensity (HSI) color space;
wherein said examining color information of the pixel comprises examining HSI information of the pixel.

17. The method of claim 14,
wherein the function is a fuzzy membership function.

18. The method of claim 17,
wherein the fuzzy membership function is one of:
a triangle fuzzy membership function;
a trapezoidal fuzzy membership function; and
a step fuzzy membership function.

19. The method of claim 10,
wherein said determining contributions of each pixel to one or more color categories comprises creating a data structure having values representing the total contributions of pixels to each of the color categories;
wherein said determining information regarding the total contributions of pixels to each of the color categories comprises determining the values of the data structure.

20. A computer-implemented method for characterizing the color information of an image, wherein the image comprises a plurality of pixels, wherein a color space representing possible colors of the pixels is divided into a plurality of bins, the method comprising:
for each of at least a subset of pixels of the image:
examining color information of the pixel to determine a bin corresponding to the color information of the pixel;
applying a function based on a location of the pixel within the bin to determine a contribution of the pixel to one or more neighboring bins, wherein the contribution comprises a respective percentage of the pixel for each of the one or more neighboring bins;
assigning values to the bin and the one or more neighboring bins based on the determined contributions of the pixel to the one or more neighboring bins;
wherein the total assigned values across the bins of the color space characterize the color information of the image.

21. The method of claim 20,
wherein the color space is the Hue, Saturation, Intensity (HSI) color space;
wherein said examining color information of the pixel comprises examining HSI color information of the pixel.

22. The method of claim 20,
wherein the function is a fuzzy membership function.

23. The method of claim 20,
wherein a first pixel falls within a first bin;
wherein the location of the first pixel within the first bin is a first distance away from a second bin, with respect to color space difference, wherein the second bin neighbors the first bin, with respect to the portion of color space to which the first and second bins correspond;
wherein a second pixel falls within the first bin;
wherein the location of the second pixel within the first bin is a second distance away from the second bin, with respect to color space difference;
wherein the second distance is less than the first distance;
wherein applying the function based on the location of the first pixel within the first bin results in determining a contribution of the first pixel to the second bin;
wherein applying the function based on the location of the second pixel within the first bin results in determining a contribution of the second pixel to the second bin;
wherein the contribution of the second pixel to the second bin is greater than the contribution of the first pixel to the second bin.

24. A system for characterizing colors of an image, wherein the image comprises a plurality of pixels, the system comprising:
a processor;
a memory medium coupled to the processor, wherein the memory medium stores color characterization software;
wherein the processor is operable to execute the color characterization software to:
for each respective pixel of at least a subset of pixels of the image, assign values to one or more color categories based on color information of the pixel;
wherein, for each of one or more first pixels, said assigning comprises assigning values to a plurality of the color categories based on color information of the pixel, wherein, for each of the one or more first pixels, said assigning comprises assigning a percentage of the pixel to each of the plurality of color categories;
wherein the processor is operable to determine information regarding the total values of pixels assigned to each of the color categories, wherein said information characterizes colors of the image.

25. The system of claim 24,
wherein each of the one or more color categories corresponds to a portion of a color space.

26. The system of claim 25,
wherein, for each respective pixel of the at least a subset of pixels, in assigning values to the one or more color categories based on color information of the pixel, the processor is operable to:
determine a location of the, pixel within the color space;
apply a function based on the location of the pixel within the color space to determine the values assigned to the one or more color categories.

27. The system of claim 26,
wherein the function is a fuzzy membership function.

28. The system of claim 24,
wherein, in performing said assigning values to one or more color categories based on color information of each pixel, the processor is operable to create a data structure having values representing the total values of pixels assigned to each of the color categories;
wherein said determining information regarding the total values of pixels assigned to each of the color categories comprises determining the values of the data structure.

29. A computer readable memory medium comprising program instructions operable to:
for each respective pixel of at least a subset of pixels of an image, assign values to one or more color categories based on color information of the pixel;
wherein, for each of one or more first pixels, said assigning comprises assigning values to a plurality of the color categories based on color information of the pixel, wherein, for each of the one or more first pixels, said assigning comprises assigning a percentage of the pixel to each of the plurality of color categories; and
determine information regarding the total values of pixels assigned to each of the color categories, wherein said information characterizes colors of the image.

30. The computer readable memory medium of claim 29,
wherein each of the one or more color categories corresponds to a portion of a color space.

31. The computer readable memory medium of claim 30,
wherein, for each respective pixel of the at least a subset of pixels, said assigning values to the one or more color categories based on color information of the pixel comprises:
determining a location of the pixel within the color space;
applying a function based on the location of the pixel within the color space to determine the values assigned to the one or more color categories.

32. The computer readable memory medium of claim 31,
wherein the function is a fuzzy membership function.

33. The computer readable memory medium of claim 29,
wherein said assigning values to one or more color categories based on color information of each pixel comprises creating a data structure having values representing the total values of pixels assigned to each of the color categories;
wherein said determining information regarding the total values of pixels assigned to each of the color categories comprises determining the values of the data structure.

* * * * *